July 31, 1962   A. R. DE VITO   3,047,325
DOOR CONTROL MECHANISMS
Filed July 2, 1959   13 Sheets-Sheet 1

INVENTOR.
ANGELO R. deVITO
BY Hudson, Boughton,
Williams, David & Hoffman
ATTORNEYS July 31, 1962 A. R. DE VITO 3,047,325
DOOR CONTROL MECHANISMS
Filed July 2, 1959 13 Sheets-Sheet 2
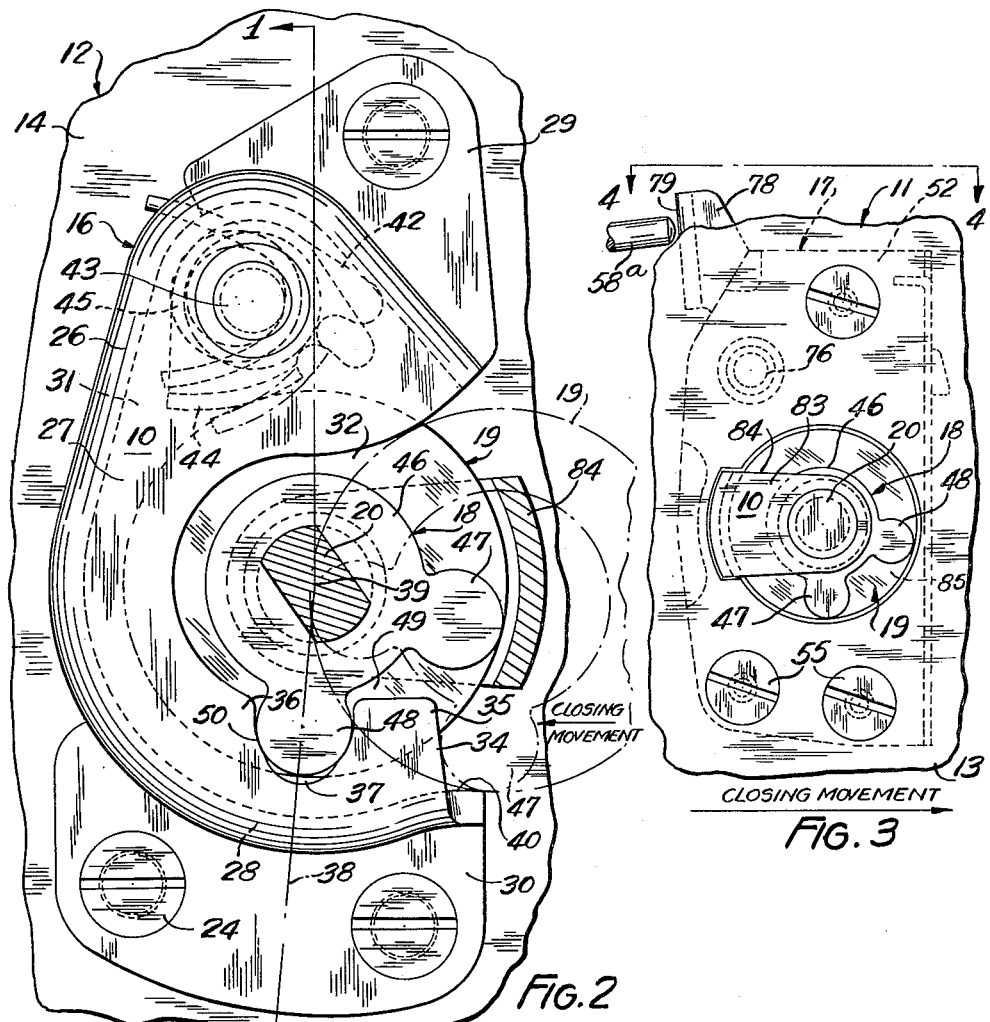
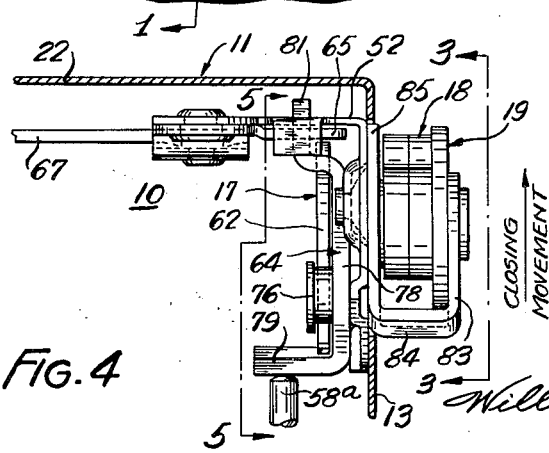
INVENTOR.
ANGELO R. deVITO
ATTORNEYS

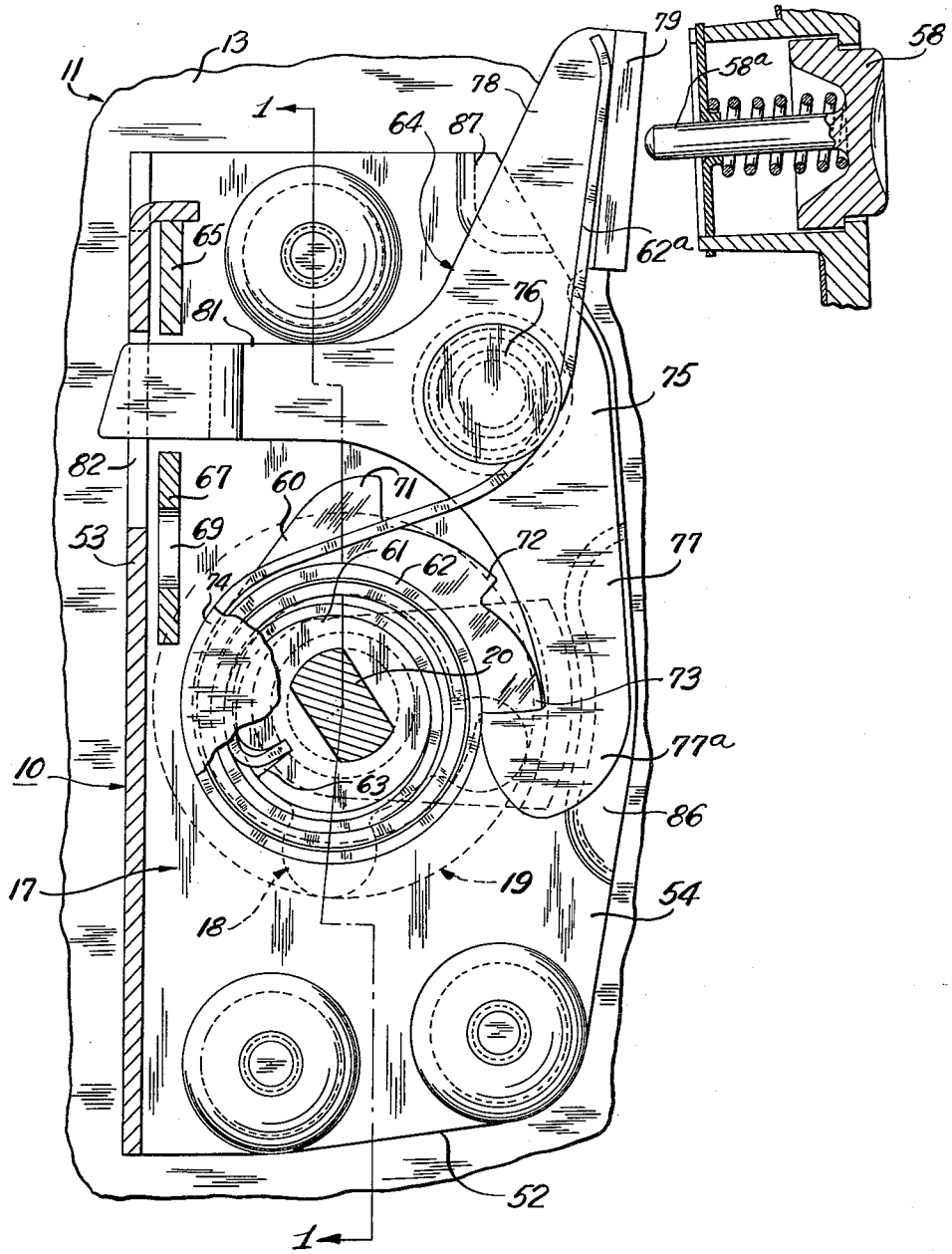

INVENTOR.
ANGELO R. deVITO
BY Hudson Boughton
Williams, David & Hoffmann
ATTORNEYS

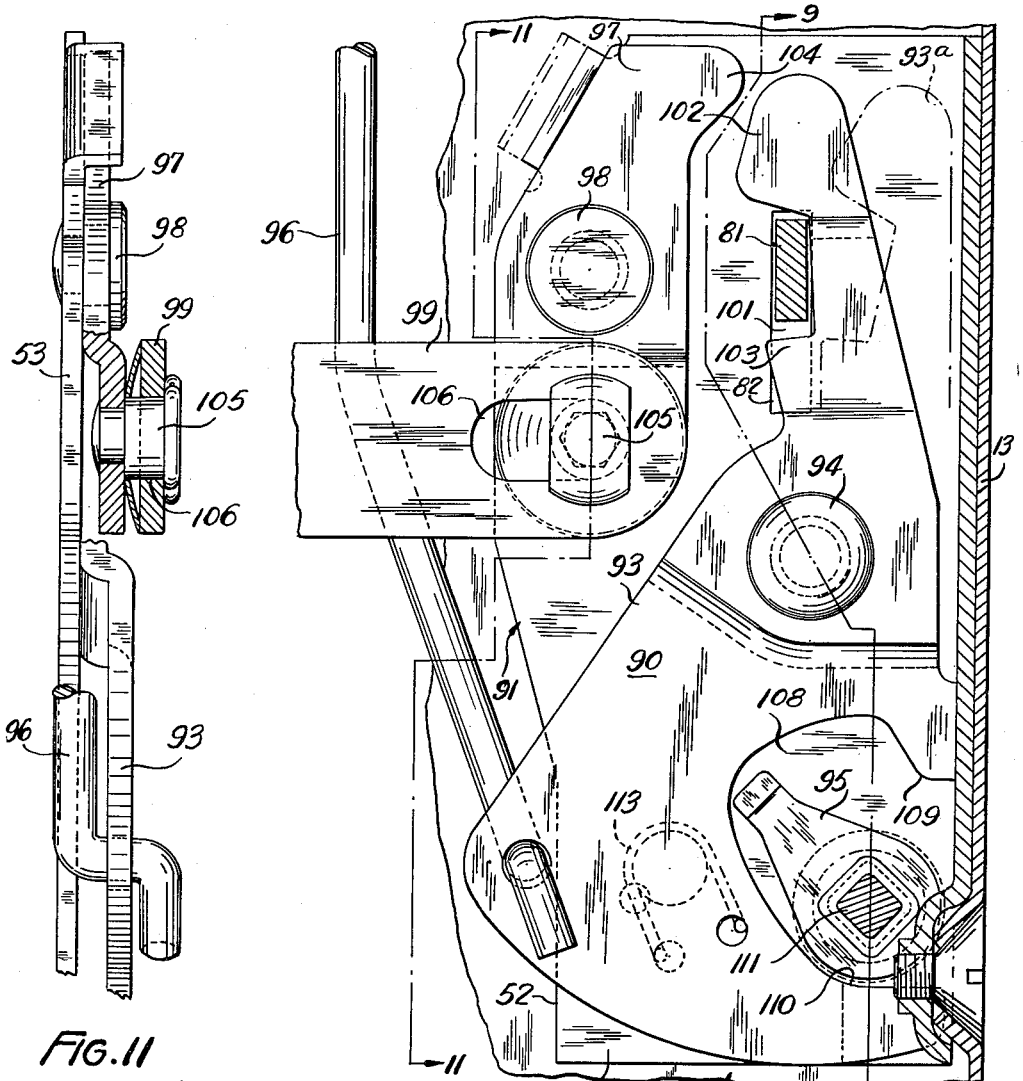
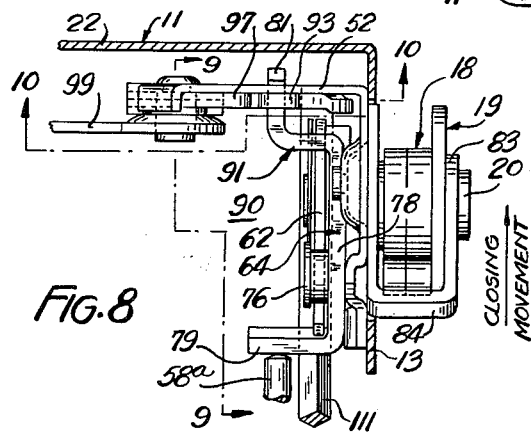
FIG. 11
FIG. 10
FIG. 8

INVENTOR.
ANGELO R. deVito

INVENTOR.
ANGELO R. deVITO

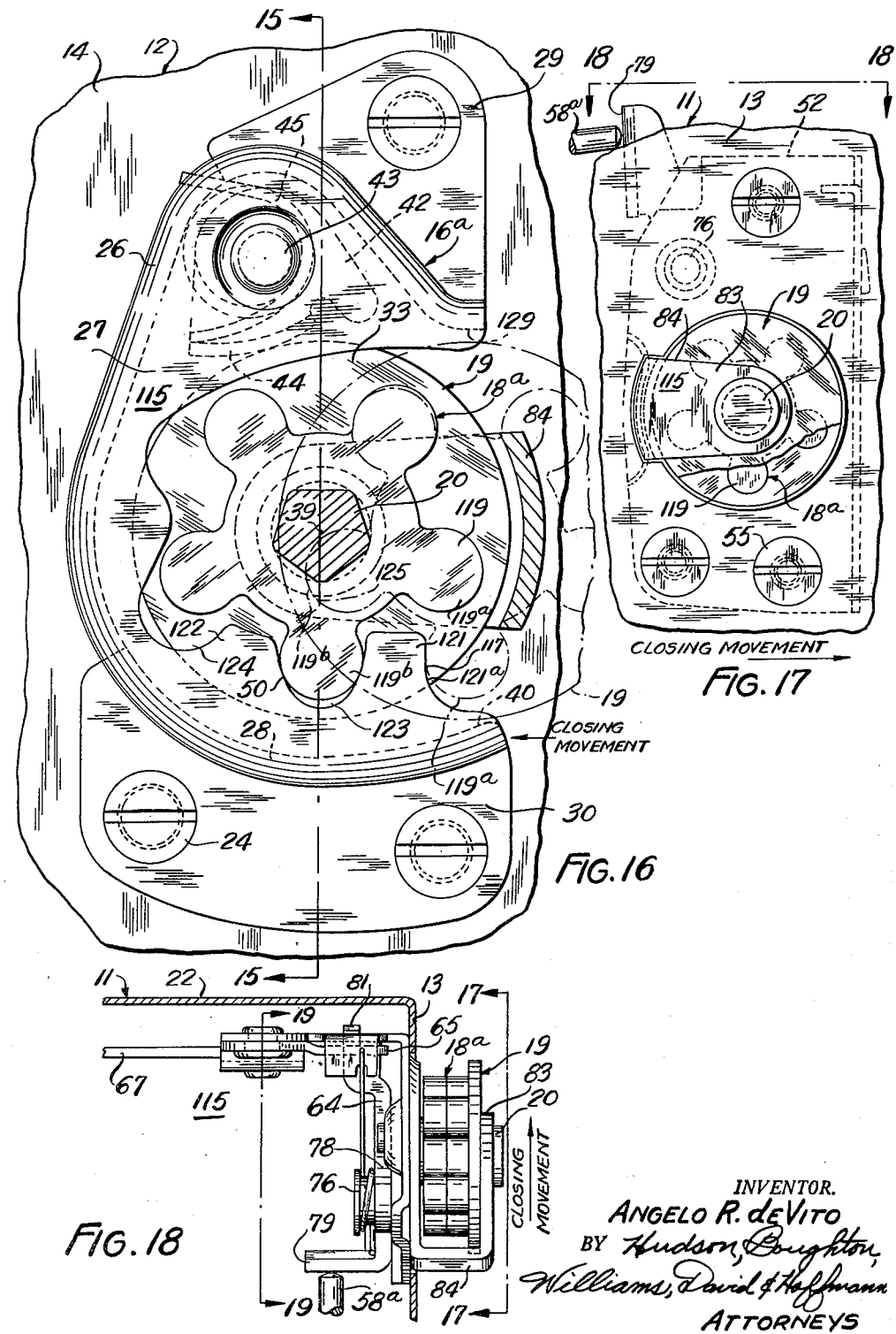

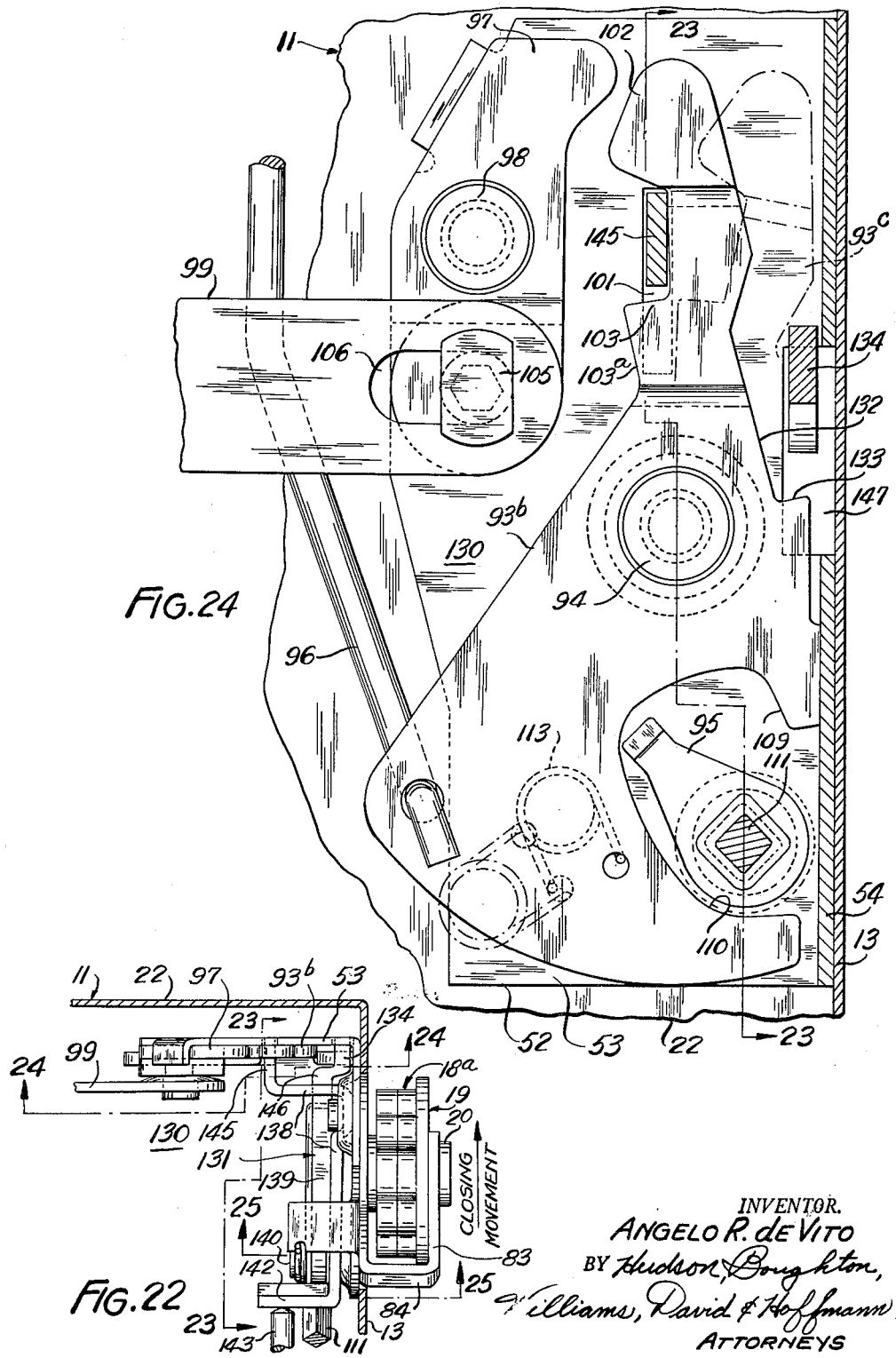

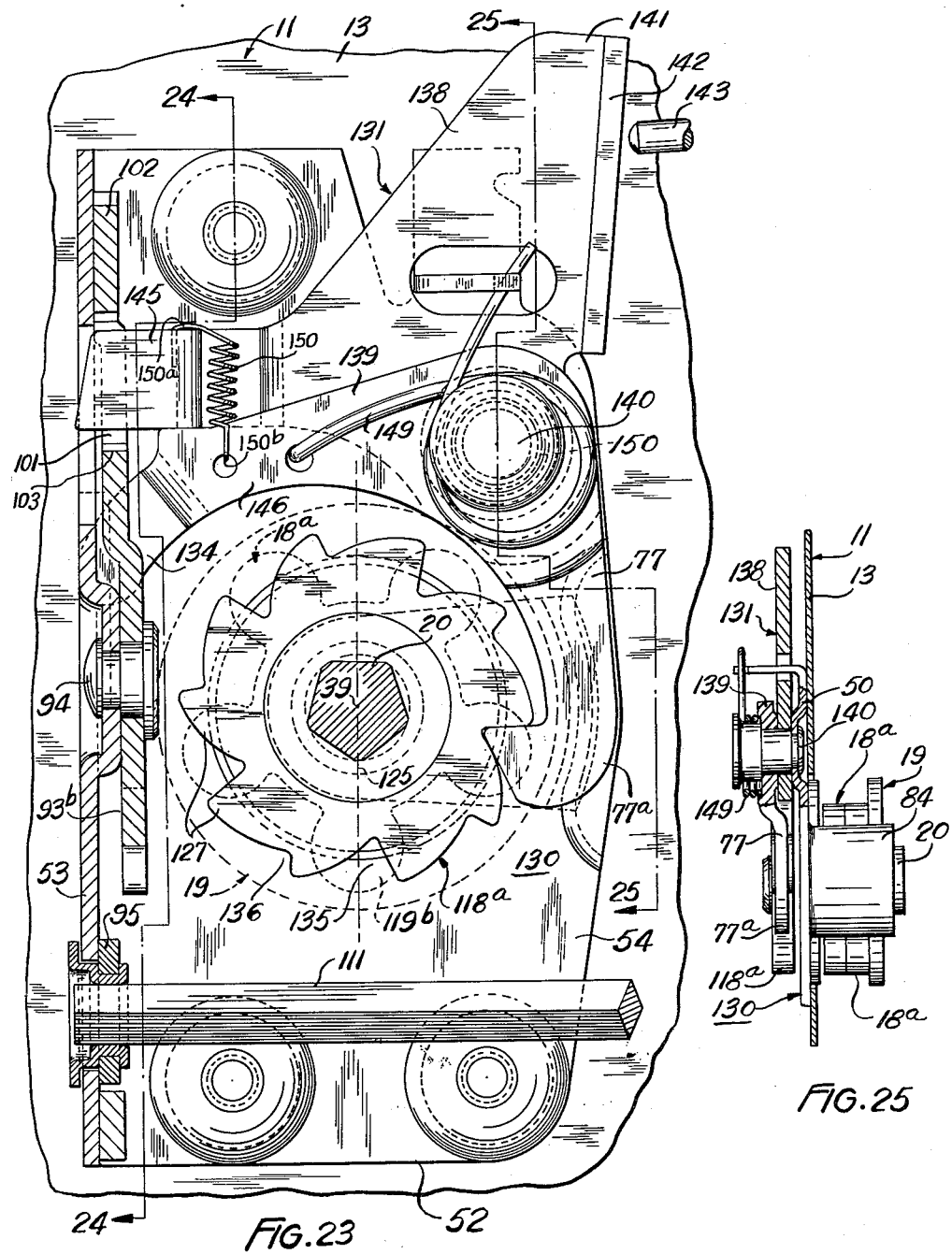

July 31, 1962  A. R. DE VITO  3,047,325
DOOR CONTROL MECHANISMS
Filed July 2, 1959  13 Sheets-Sheet 13
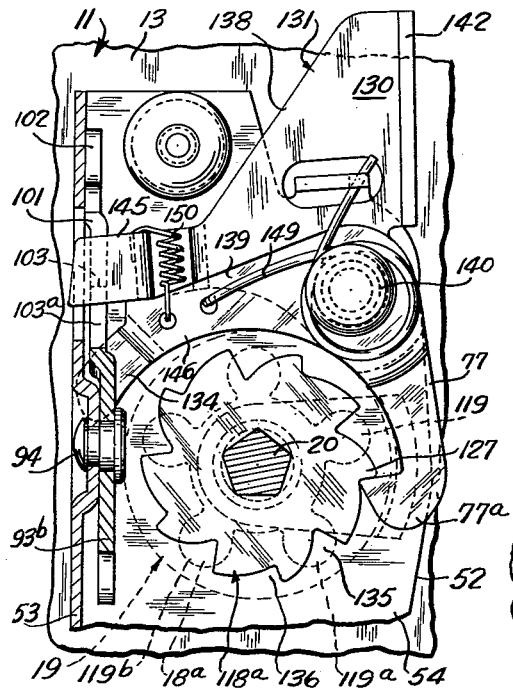
FIG. 26
FIG. 27
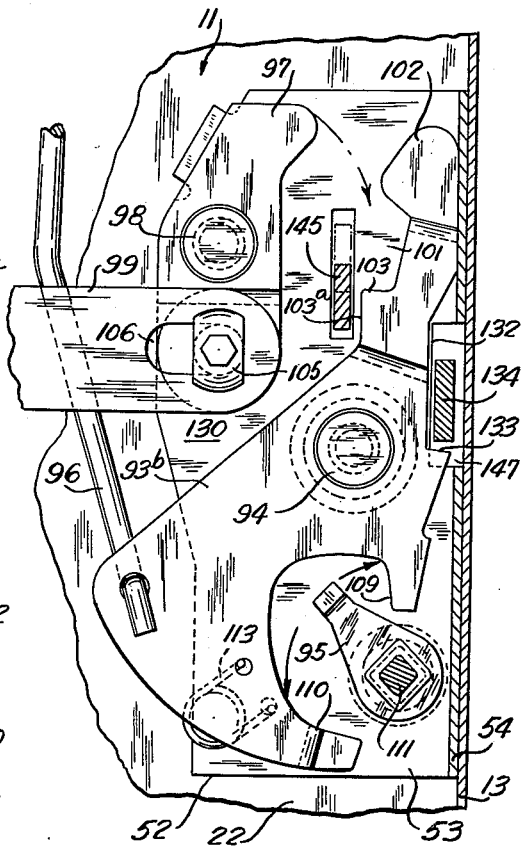
FIG. 28
INVENTOR.
ANGELO R. deVITO
BY Hudson, Boughton,
Williams, David & Hoffmann
ATTORNEYS United States Patent Office 3,047,325
Patented July 31, 1962

3,047,325
DOOR CONTROL MECHANISMS
Angelo R. De Vito, 1210 Mayfair Place, Rockford, Ill., assignor to Lisle W. Menzimer, Rockford, Ill., trustee
Filed July 2, 1959, Ser. No. 824,689
17 Claims. (Cl. 292—280)

This invention relates to door control mechanisms of the co-operating latch and keeper type and provides a simple and practical construction for control mechanisms of this kind and which, when applied to vehicle doors, affords a more positive and satisfactory control than has been obtainable heretofore.

This application is related, as to subject matter and ownership, to application Serial No. 776,571 filed November 26, 1958.

An object of this invention is to provide a novel door lock mechanism of the co-operating latch and keeper type which will effectively hold the door against chatter or rattle as well as to retain the door in a latched, or latched and locked condition and, in addition, will effectively prevent the spreading apart of the door and an associated doorpost which often occurs as the result of a collision.

Another object is to provide a novel door lock mechanism of the kind above referred to wherein the latch is pivotally mounted and is of a toothed form for meshing co-operation with a keeper rack, and wherein a roller associated with the latch is adapted for guiding engagement with a guide portion of the keeper to facilitate the movement of the latch to a door-latched position in mesh with the rack, the roller in its final position being effective as an antispread holding element but being otherwise spaced from the body of the keeper so that the door-latched position of the latch is in a load-supporting and antirattle meshed engagement with the rack.

As still another object thereof, this invention provides a door lock mechanism of the character mentioned above and having co-operating ratchet and detent means for releasably retaining the latch in its door-latched and door-supporting engagement with the keeper, and also having locking means for co-operation with the detent means for establishing a door-locked condition of the mechanism, the toothed latch preferably being a gear wheel and the locking means being actuatable by either an inside or outside manual means, to a blocking position relative to the detent means.

Yet another object is to provide a novel door lock construction in which all of the features and advantages of the foregoing objects are obtained in an organization comprising a minimum number of co-operating parts.

Additionally, this invention provides a novel door lock mechanism having a pivoted latch connected with a ratchet wheel and detent means co-operating with the ratchet wheel, the latch and ratchet wheel each having a full circumferential complement of teeth and the ratchet wheel also having intervening full-depth and shallow-depth tooth spaces in alternating relation between the teeth thereof, the locking mechanism also comprising locking means which is manually operable to establish a locked condition of the mechanism when the detent means is engaged in a full-depth tooth space and is manually inoperable when the detent means is engaged in a shallow-depth tooth space.

Other objects and advantages of this invention will be apparent in the following detailed description and in the accompanying drawings forming a part of this specification and in which, FIG. 1 is a longitudinal vertical section through door control mechanism provided by this invention, the view being a large-scale view taken as indicated by section line 1—1 of FIGS. 2 and 5 and showing the latch of a left-side vehicle door in a door-latched position of engagement with the associated keeper;

FIG. 2 is a large-scale transverse vertical section taken through the mechanism and looking toward the keeper as indicated by section line 2—2 of FIG. 1;

FIG. 3 is a normal-scale elevational view looking toward the latch and edgewise of the door, as indicated by the directional line 3—3 of FIG. 4;

FIG. 4 is a normal-scale partial plan view of the mechanism and showing adjacent portions of the door in section, the view being taken as indicated by the directional line 4—4 of FIG. 3;

FIG. 5 is a large-scale transverse vertical section taken on section line 5—5 of FIGS. 1 and 4 and showing the co-operating ratchet and detent means;

Figure 1:
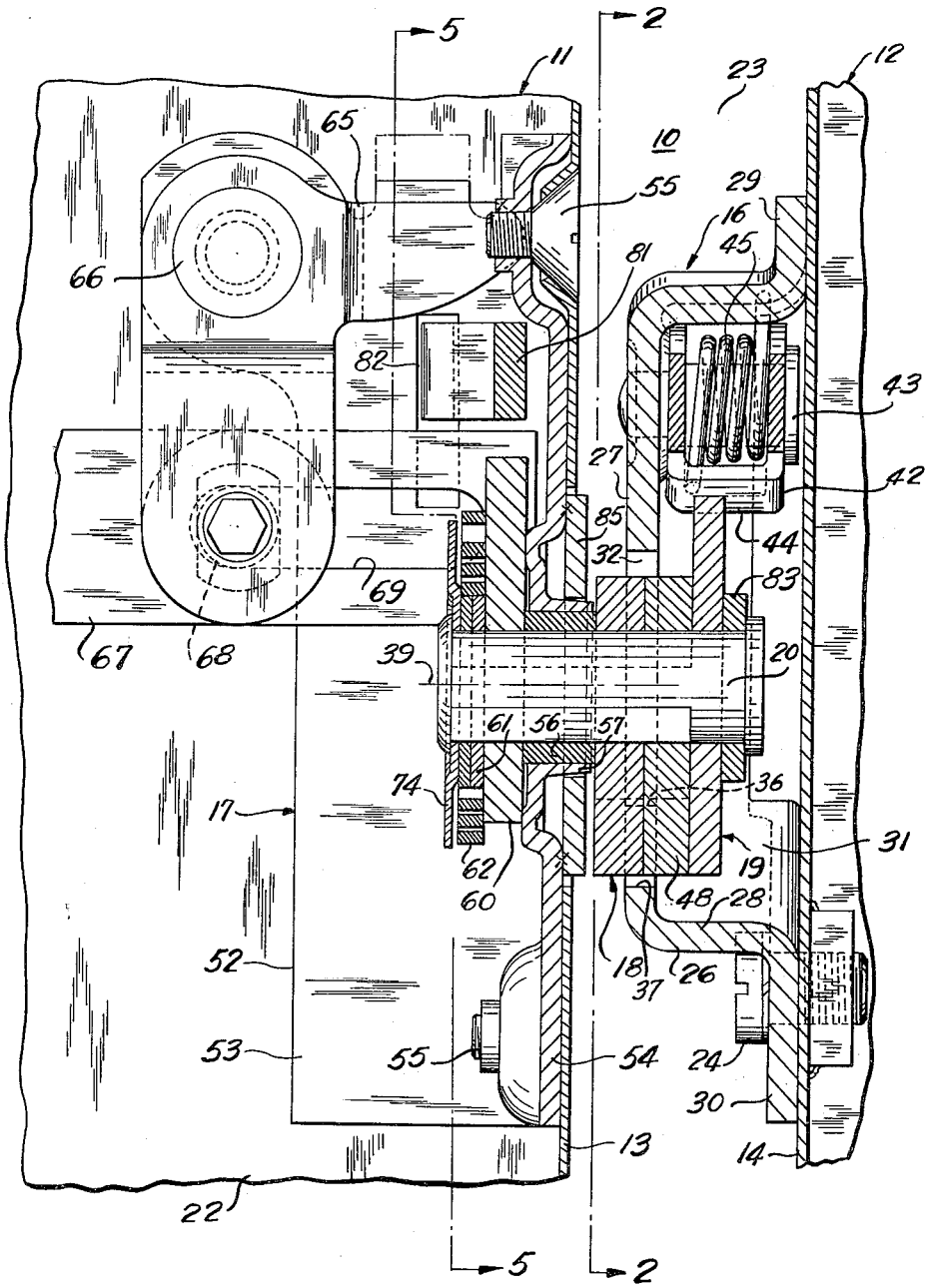
Figure 20:
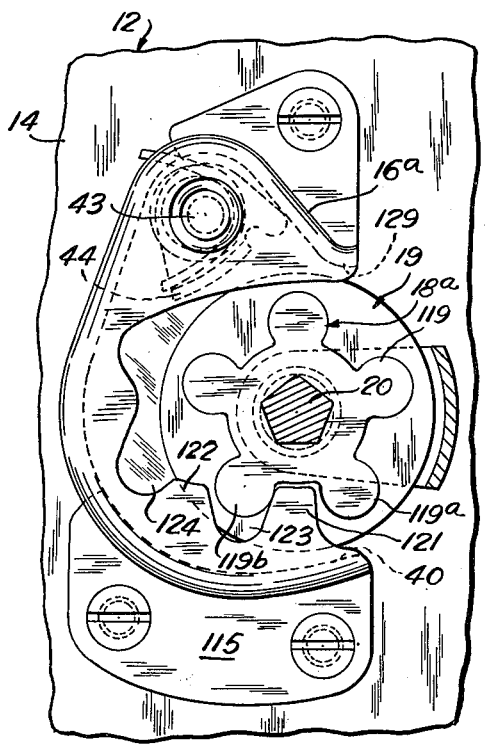
Figure 21:
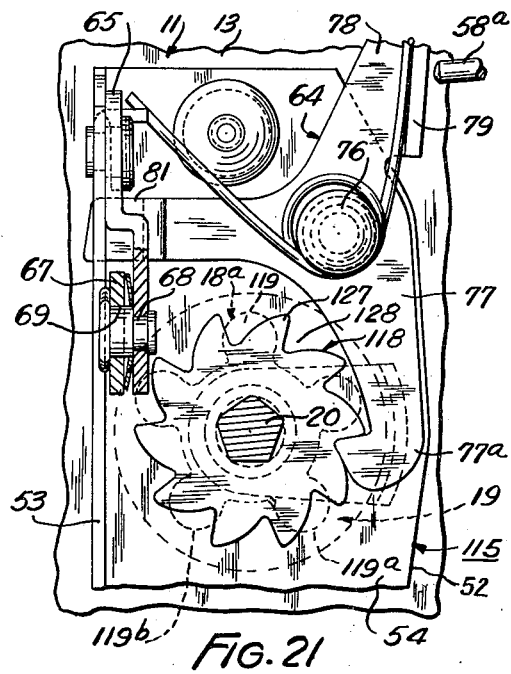
Figure 9:
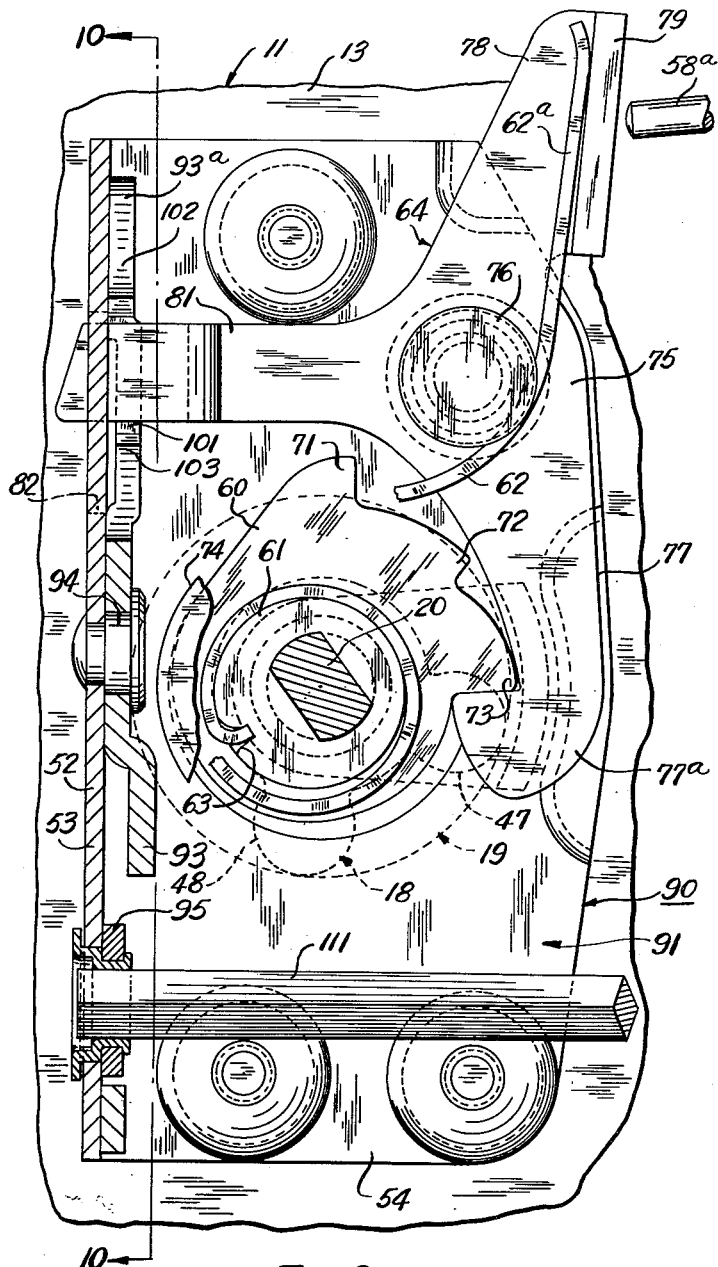
Figures 12, 13, 14:
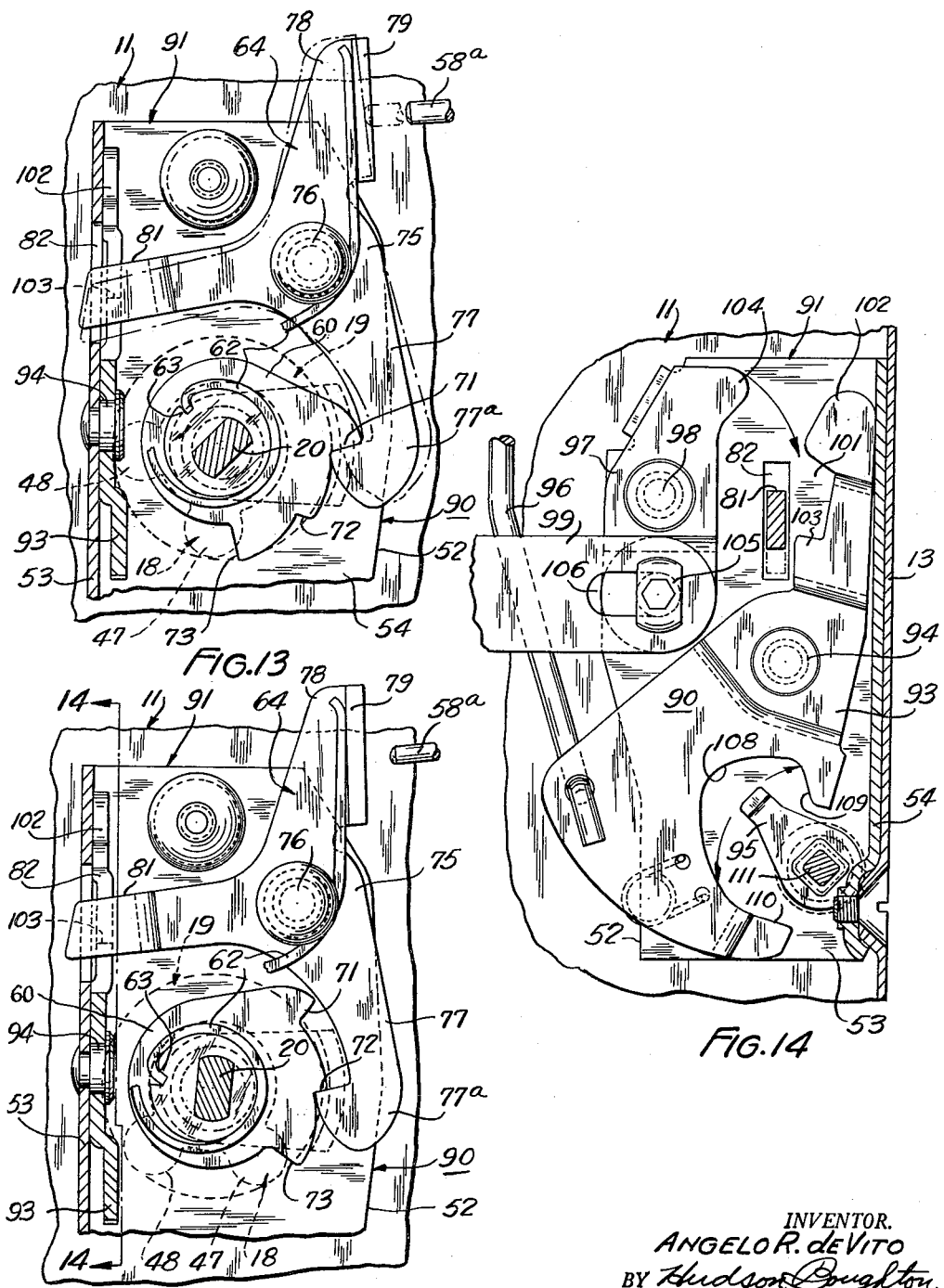
Figure 15:
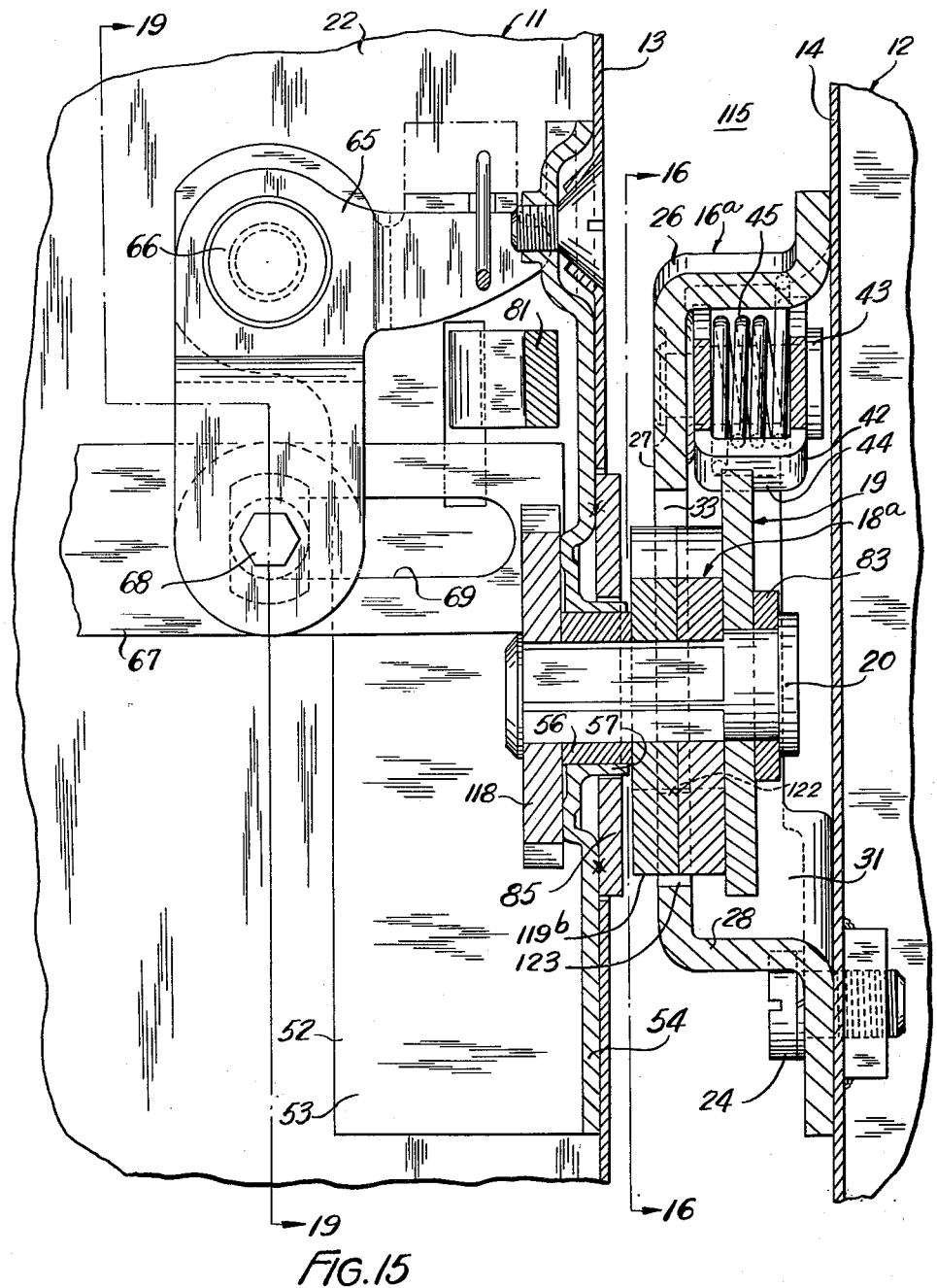
Figure 19:
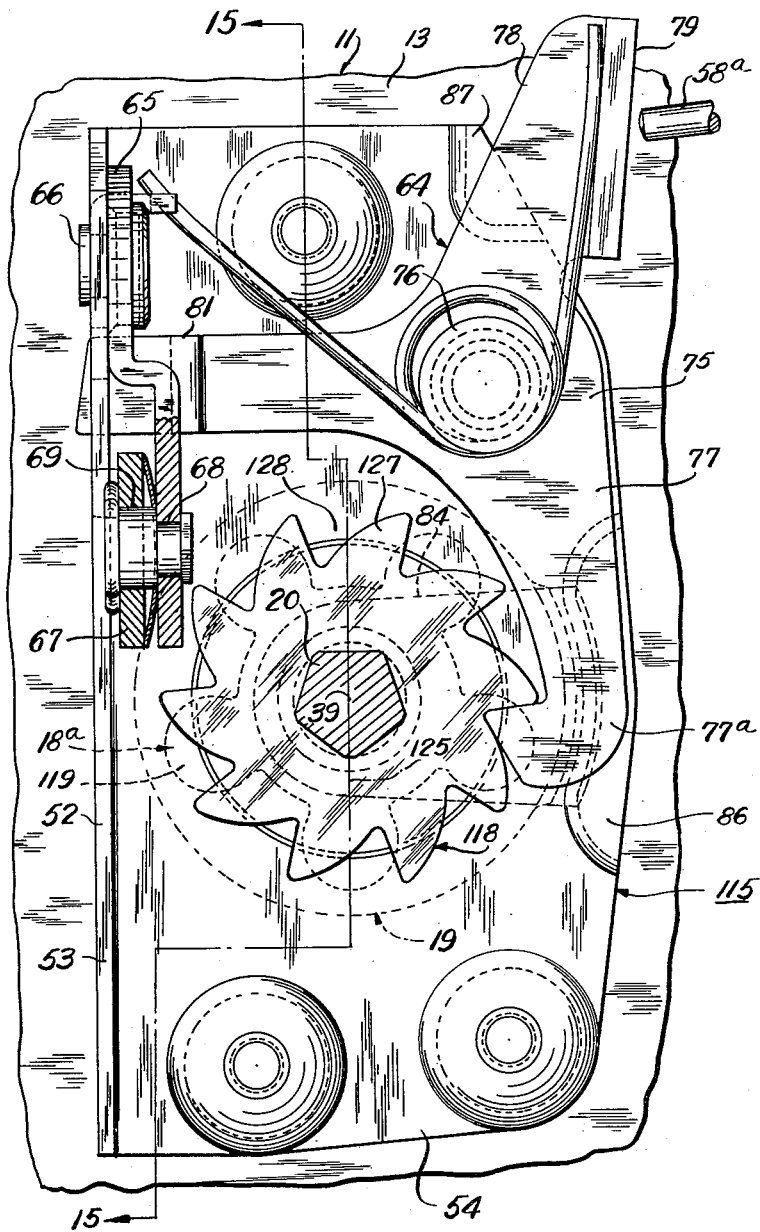

FIGS. 8 to 14 inclusive illustrate a first modified form of door control mechanism, FIG. 8 being a normal-scale plan view similar to that of FIG. 4 but showing the inclusion of key-actuatable locking means in such first modification;

FIG. 9 is a large-scale vertical section taken on section line 9—9 of FIGS. 8 and 10;

FIG. 10 is a large-scale vertical section taken on section line 10—10 of FIGS. 8 and 9;

FIG. 11 is a large-scale fragmentary vertical section taken on section line 11—11 of FIG. 10;

FIG. 12 is a partial transverse vertical section similar to that of FIG. 9 but showing the positions assumed by the movable parts of the first modification when the mechanism is in a safety-latched condition;

FIG. 13 is another such partial transverse vertical section of the first modification but showing the positions of the parts for the door-unlatched condition of the mechanism;

FIG. 14 is a vertical section of the first modification, similar to that of FIG. 10, but showing the positions of the locking lever and inside control arm for the unlocked condition of the mechanism;

FIGS. 15 to 21 inclusive illustrate a second modified form of door control mechanism, FIG. 15 being a large-scale longitudinal vertical section similar to that of FIG. 1 but showing the inclusion in such second modification of latch and ratchet members provided with a full circumferential complement of teeth, the view of FIG. 15 being taken on section line 15—15 of FIGS. 16 and 19;

FIG. 16 is a large-scale transverse vertical section taken on section line 16—16 of FIG. 15;

FIG. 17 is a normal scale elevational view looking toward the latch and edgewise of the door, the view being taken as indicated by the directional line 17—17 of FIG. 18;

FIG. 18 is a normal-scale partial plan view with adjacent portions of the door in section, the view being taken as indicated by the directional line 18—18 of FIG. 17;

FIG. 19 is a large-scale transverse vertical sectional view taken as indicated by section line 19—19 of FIGS. 15 and 18;

FIG. 20 is a transverse vertical section similar to that of FIG. 16 but showing the position of the latch when the mechanism of the second modification is in a safety-latched condition;

FIG. 21 is a partial transverse vertical section similar to that of FIG. 19 but showing the positions of the movable parts of the second modification when the mechanism is in the safety-latched condition;

FIGS. 22 to 28 inclusive illustrate a third modified form of door control mechanism, FIG. 22 being a normal-scale plan view of the mechanism with adjacent portions of the door in section and the view being similar to those of FIGS. 4, 8 and 18;

FIG. 23 is a large-scale transverse vertical section taken on section line 23—23 of FIGS. 22 and 24;

FIG. 24 is a large-scale vertical section taken on section line 24—24 of FIGS. 22 and 23;

FIG. 25 is a normal-scale partial vertical section taken on section line 25—25 of FIGS. 22 and 23;

FIG. 26 is a partial transverse vertical section similar to that of FIG. 23 but showing the positions of the movable parts of the third modification when the mechanism is in the safety-latched condition;

FIG. 27 is another such partial transverse vertical section illustrating the self-unlocking action of the mechanism; and FIG. 28 is a vertical section of the third modification, taken on section line 28—28 of FIG. 27, and showing the locking lever as having just been moved to its unlocking position.

One embodiment of the door control mechanism 10 of this invention is shown in FIGS. 1 to 7 inclusive as applied to a vehicle door 11 and an associated doorpost 12, in this case a left-hand side door of the vehicle. The door 11 is a swingably mounted door having an upright free rear edge represented by the edge wall or face 13 which, in the closed position of the door, is located in a substantially fore-and-aft opposed relation to an upright wall or face 14 of the doorpost 12.

The door control mechanism 10 comprises, in general, a keeper 16 mounted on the doorpost 12 and a latch device 17 mounted on the door 11 and having as components thereof a pivoted latch 18 and a guide roller 19 which are movable into the keeper when the door is swung to its closed position. The latch device 17 includes a pivot shaft 20 to which the latch 18 is secured and on which the roller 19 is journalled.

The door 11 is here shown as being of the kind having spaced side walls 22 and containing a space or chamber between such walls and in which the latch device 17 is located with the pivot shaft 20 of the latter projecting through an opening of the edge wall 13. The space 23 between the edge walls 13 and 14 of the door and doorpost, when the door is in its closed position as shown in FIG. 1, is a cleavage crevice lying in, or extending in the direction of, a vertical transverse plane of the vehicle. The keeper 16 is here shown as being located in the cleavage crevice 23 and mounted on the doorpost 12 by means of suitable attaching screws 24.

The keeper 16 comprises a hollow body 26, in this case a stamped sheet metal body having connected front and edge wall portions 27 and 28 and also having upper and lower attaching lugs 29 and 30 adapted to be clamped against the edge wall 14 of the doorpost so that the body of the keeper co-operates with the latter in defining therebetween a keeper pocket 31. The keeper 16 is provided with an opening for receiving the latch 18 and which opening is here shown as being in the form of a notch 32 extending in a lateral direction into the front wall 27 from the outer edge of the keeper, such notch being in communication with the pocket 31. The edge wall 28 has an access opening which communicates in a lateral direction with the pocket 31 and the notch 32.

The keeper 16 also comprises a rack 34 formed on the front wall 27 and having a plurality of teeth or partial teeth. The rack 34 is located on one side of the notch 32, in this case on the lower side thereof as shown in FIG. 2, and comprises one full tooth 35 and one partial tooth 36. The teeth 35 and 36 are separated by an intervening tooth space or recess 37 which, in the installed position of the keeper, is substantially centered on a vertical line 38 extending through the axis 39 of the pivot shaft 20. The edge wall 28 of the keeper is a curved wall spaced below the lower end of the tooth recess 37, as shown in FIG. 2, but the portion of this edge wall which is located at or adjacent the entry side of the keeper forms a guide surface 40 which is engageable by the roller 19 during movement of the latch 18 into and out of the keeper, as will be further explained hereinafter.

The keeper 16 is provided on the side thereof opposite to the rack 34, in this case in the upper portion of the pocket 31, with a thrust member or door support pawl 42 which is engageable by the periphery of the roller 19 for preventing chatter or rattle of the door when the latter has been moved to its closed position. The pawl 42 is swingable on a pivot pin 43 mounted in the front wall 27 and is here shown as being a stirrup-shaped member having a camming portion 44 on the underside thereof adapted to be pressed against the roller 19 by a torsion spring 45 surrounding the pivot pin.

The latch 18 is of a toothed or gear-like form, as shown in FIG. 2, and comprises a hub or body portion 46 secured on the pivot shaft 20 and a plurality of teeth, in this case two such teeth 47 and 48 separated by an intervening tooth recess 49. The latch can be of a solid or one-piece construction, or as shown in the drawings, may comprise two plate members in a face-to-face relation.

The body portion 46 of the latch is of a size and shape to be freely movable into the notch 32 of the keeper 16 and, when the door 11 arrives at its closed and door-latched position shown in FIGS. 1 and 2, the tooth 48 is fully engaged in the tooth recess 37 of the rack 34. During the inward swinging movement of the door 11 to its closed position, the latch tooth 47 comes into engagement with the rack tooth 35 first, as is indicated by the phantom-line position of the latch in FIG. 2, to thereby cause a counterclockwise swinging of the latch which results in the engagement of the latch tooth 48 in the tooth recess 37.

The roller 19 is disposed in a substantially coaxial relation with the latch 18 and, as the latch moves into the notch 32 to its door-latched position in engagement with the rack 34 in the manner just explained above, the roller moves into the pocket 31 to a corresponding door-latched position for the roller as shown in full lines in FIG. 2. The roller 19 is of a diameter such that when it has arrived at its door-latch position, its lower peripheral edge portion will be spaced a substantial distance above the concavely curved upper surface of the lower edge wall portion 28 of the keeper body so that the engaged latch tooth 48 will be in a load-carrying and door-supporting engagement with the rack 34, as is here represented by the two points of bearing contact 50 between the side faces of this tooth and the side faces of the tooth recess 37.

The diameter of the roller 19 is also such that during the movement of the latch 18 into the keeper opening 32 the lower segment of the periphery of the roller will usually come into engagement with the guide portion 40 of the keeper, as is indicated by the phantom-line position of the roller in FIG. 2. This will occur particularly if the door 11 is somewhat misaligned or has sagged, and such engagement of the roller with this guide portion will automatically lessen the detrimental effect of such misalignment or sagging of the door and will also facilitate the movement of the latch into the keeper opening. Furthermore, the guiding co-operation thus obtained by means of the roller 19 during closing of the door prevents objectionable bumping of the latch 18 against the keeper 16, such as might result in noise and damage. The guiding co-operation between the roller 19 and the portion 40 of the keeper will usually also occur during the opening movement of the door to facilitate the movement of the latch 18 out of the keeper. It will thus be recognized that the co-operation of the roller 19 with the keeper 16 achieves a smooth roll-in and roll-out movement of the latch into and out of the keeper, thereby causing smooth and easy door closing and door opening actions with less wear and jar on the latch and keeper and consequently resulting in a longer life for the door control mechanism.

The roller 19 is also of a diameter in relation to the transverse width of the keeper notch 32 such that portions of the roller, when in its door-latched position shown in full lines in FIG. 2, will lie in back of the portions of the keeper front wall 27 which border the notch 32 laterally thereof as well as on the vertically opposite sides thereof. This enables the roller 19 to also serve as an antispread member for preventing spreading apart of the door 11 and doorframe 12 such as frequently occurs when a vehicle is involved in a collision.

From the construction of the parts and their relative arrangement in the door control mechanism 10 as thus far described, it will be seen that when the door 11 is in its closed and door-latched position shown in FIGS. 1 and 2, the upper edge portion of the roller 19 will be engaged by the pawl 42 and the latch tooth 48 will be seated in a meshed and load-supporting relation in the tooth recess 37 of the rack 34. The door 11 will then be supported and held against rattle or chatter with the lower peripheral edge portion of the roller 19 in a free condition and in a spaced relation above the lower edge wall 28 of the keeper.

The latch device 17 comprises a support or mounting plate 52 having substantially right-angularly disposed flange portions 53 and 54, the latter of which is attached to the edge wall 13 of the door as by means of suitable connecting screws 55. The pivot shaft 20 is mounted in the flange 54 by means of a bushing 56 supported in a sleeve portion 57 of the flange. The latch device 17 includes a ratchet 60 and an anchor plate 61, both secured on the shaft 20, and a spiral spring 62 surrounding the anchor plate 61 and having its inner end engaged in a notch 63 of the latter. The spring 62 is a torsion spring which is effective on the ratchet 60 for swinging the same toward its door-unlatched position, that is, in a clockwise direction as seen in FIG. 5. This spring is also effective on the latch 18, through the pivot shaft 20, for swinging the latch in a direction relative to the keeper 16 for producing a throw-out movement of the latch which assists in the initial opening movement of the door and in disengaging the latch from the keeper.

The latch device 17 also comprises detent means 64 for holding co-operation with the ratchet 60 and actuatable either by an outside control such as the push button 58, or by an actuating lever 65 forming a part of an inside control and swingably mounted on the upper portion of the flange 53 by means of a pivot pin 66. The inside control also includes a link 67 having its adjacent end operatively connected with the lever 65 by co-operating pin and slot elements 68 and 69 and whose remote end is connected with a swingable inside handle (not shown) of the door 11. As will be explained hereinafter, the link 67 also functions as a locking member and the lever 65 functions as an unlatching lever.

The ratchet 60 has a plurality of the ratchet teeth thereon, in this case three such teeth 71, 72 and 73. The co-operation of the detent means with these teeth of the ratchet for holding the latch 18 in its different positions will be explained presently. The spiral spring 62 referred to above is maintained in proper position around the anchor plate 61 by means of a suitable cover plate 74 mounted on the inner end of the pivot shaft 20.

The detent means 64 is here shown as comprising a lever 75 swingably mounted on the flange 54 by a pivot pin 76 and having a detent arm 77 and an outside actuating arm 78 provided with a contact portion 79 engageable by the stem 58ᵃ of the push button 58. The lever 75 also has an inside control arm 81 whose free end extends through and is swingable in a slot 82 of the flange 53.

The detent arm 77 has a hooked-shaped end forming a holding portion or detent element 77ᵃ which is cooperable with the teeth of the ratchet 60 and controls or checks the clockwise rotatable movement thereof by the spiral spring 62 as seen in FIG. 5. The outside actuating arm 78 of the detent means 64 is manually movable by the push button 58 in a counterclockwise direction as seen in FIG. 5, in opposition to the spring portion 62ᵃ for swinging the detent arm 77 in a direction to release the ratchet 60.

Figure 6:
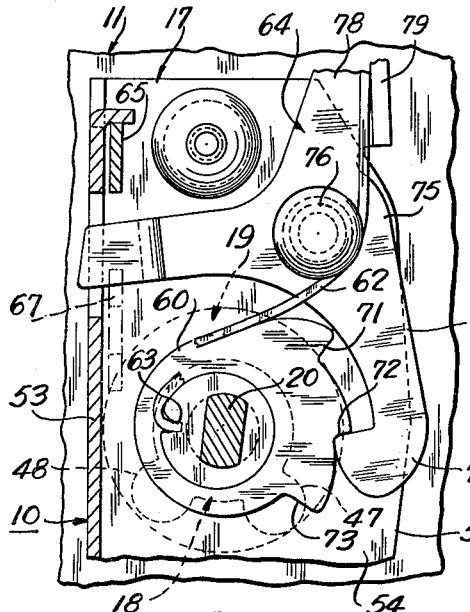
FIG. 6 is a partial transverse vertical section similar to that of FIG. 5 but showing the positions assumed by the movable parts when the mechanism is in a safety-latched condition.
Figure 7:
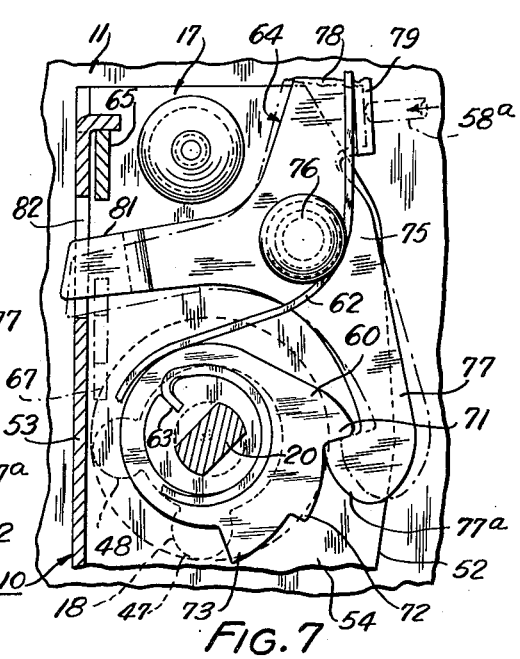
FIG. 7 is another such partial transverse vertical section of the mechanism of FIG. 1 but showing the positions of the parts for the door-unlatched condition of the mechanism.

When the tooth 73 of the ratchet 60 is in engagement with the detent element 77ᵃ, the latch 18 will be retained in its door-latched position in meshed engagement with the keeper 16 as shown in FIGS. 1 and 2. When the detent element 77ᵃ is engaged by the intermediate tooth 72 of the ratchet 60, the latch 18 will be retained in its safety-latched position as shown in FIG. 6. When the door 11 is in an open or partially open position in which the latch 18 has been disengaged from the keeper 16, the ratchet tooth 71 will have been moved into engagement with the detent element 77ᵃ by the spiral spring 62 as shown in FIG. 7.

The inside control arm 81 of the detent means 64 is engageable on the upper edge thereof by the unlatching lever 65 of the inside control means so that swinging of the unlatching lever, by a pulling force applied thereto through the link 67, will move the inside control arm 81 downward for causing swinging of the detent arm 77 in a counterclockwise direction to release the ratchet 60. The link 67 has a limited endwise lost-motion movement relative to the lever 65, as permitted by the slot 69, by which the adjacent slotted end of the link can be shifted to a blocking or locking position relative to the control arm 81 as represented by the full-line position of the link as shown in FIG. 1. The link 67 is movable to this blocking position by swinging of the inside handle of the door in an opposite direction from the swinging thereof which actuates the lever 65 to cause disengagement of the detent arm 77 from the ratchet 60.

When the link 67 is in the blocking position just above described an attempt to swing the lever 75 in a counterclockwise direction, by actuation of the push button 58 to disengage the detent arm 77 from the ratchet 60, will be prevented by the blocking of the control arm 81 by the link 67. So long as the link 67 remains in this blocking position, the detent arm 77 cannot be disengaged from the ratchet 60 and, accordingly, the door control mechanism 10 will be in a locked condition with the latch 18 retained in its position of door-latched engagement with the keeper 16 as shown in FIG. 2. Before the latch 18 can be unlatched from the keeper 16, by a swinging of the lever 75 produced either by the push button 58 of the outside control means or by the lever 65 of the inside control means, it is necessary that the link 67 be shifted in an endwise direction toward the left as seen in FIG. 1 to retract the same from its blocking position relative to the control arm 81.

With reference to the mounting of the pivot shaft 20 on the support plate 52, it should be explained that the outer end of this shaft extends through an arm 83 of a U-shaped support bracket 84. This bracket includes a flat ring-shaped portion 85 which is attached, as by welding, to the flange 54. It should also be mentioned that the lever 75 of the detent means 64 lies alongside of embossments 86 and 87 formed on the flange 54.

When the door control mechanism 10 is in the door-latched and door-locked condition shown in FIGS. 1 to 5 inclusive, the detent element 77ᵃ is in holding engagement with the ratchet tooth 73 and the control arm 81 is in a correspondingly lifted position in the slot 82 (see FIG. 5). It is this lifted position of the control arm 81 that permits the adjacent end of the link 67 to be moved thereunder to the above-mentioned blocking position for producing the locked condition of the mechanism.

FIG. 6 shows the condition of the door control mechanism 10 when the latch 18 is in the safety-latched position at which time the teeth 47 and 48 are in a straddling relation to the tooth 35 of the keeper 16 and the detent element 77a is in holding engagement with the ratchet tooth 72. FIG. 7 shows the condition when the latch 18 is in the door-unlatched position at which time the detent element 77a is in holding engagement with the ratchet tooth 71.

For both of the safety-latched and door-unlatched conditions shown in FIGS. 6 and 7, the control arm 81 is in a relatively lowered position in the slot 82 at which time it is in a blocking position for the link 67 and prevents the latter from being shifted to its locking position of FIG. 1. The phantom-line showing of the detent lever 64 in FIG. 7 represents the maximum extent of counterclockwise swinging permitted for this lever by the slot 82 so as to prevent complete disengagement of the detent element 77a from the ratchet tooth 71.

From the illustration in FIGS. 1 to 7 inclusive and the foregoing description of the door control mechanism 10, it will now be readily understood that this mechanism is of a simple, practical and inexpensive construction and is well suited for use on a vehicle door for controlling the same with respect to latching thereof and with respect to the holding of the door in an antirattle relation when the door is in its closed position, as well as for preventing spreading between the door and associated doorpost in the event of a collision. The construction and organization shown and described for the door control mechanism 10 also provides locking means of a very simple form for achieving a locked condition of the door by actuation of the inside door handle.

FIGS. 8 to 14 inclusive of the drawings illustrate a first modified door control mechanism 90, comprising a latch device 91 and an associated keeper, and which mechanism is similar to the door control mechanism 10 but includes key-actuatable locking means by which the mechanism can be locked from the outside of the vehicle. In other respects the modified door control mechanism 90 is similar to the mechanism 10, and the corresponding parts thereof which are identical, or substantially identical, have been designated by the same reference characters. In the door control mechanism 90 all of the parts or components comprising the latch 18, the roller 19, the ratchet 60, the spring 62 and the detent means 64 are the same as in the door control mechanism 10, and the keeper with which the latch and roller co-operate is of the same construction as that which forms a part of the control mechanism 10.

The latch device 91 of the modified control mechanism 90 differs from the latch device 17 of the door control mechanism 10 in that it includes a locking lever 93 swingably mounted on the flange 53 by means of a pivot pin 94. The locking lever 93 is shown in its locking position in full lines in FIG. 10 and is swingably movable to a releasing or unlocking position represented by the phantom-line showing 93a of this view. The movement of the locking lever 93 from one to the other of its locking and releasing positions is accomplished either by a key-actuatable finger 95, or by a link 96 connected with a garnish molding button or the like (not shown). The locking lever 93 is also movable to its unlocking position by the action of a lever 97 which corresponds with the lever 65 of FIG. 1 but which is both an unlocking lever and an unlatching lever. The lever 97 is swingably mounted on the flange 53 by a pivot pin 98 and is adapted to be actuated by a pulling force transmitted thereto by a link 99 connected with an inside handle (not shown).

As shown in FIG. 10 the locking lever 93 is provided with a notch 101 on one edge thereof and with head and shoulder portions 102 and 103 located respectively above and below the notch. The notch 101 is of a size and shape to receive the inside control arm 81 of the detent means 64 when the locking lever has been swung to its full-line locking position shown in FIG. 10. When the locking lever is in this position, the shoulder 103 is in a blocking position relative to the control arm 81 to thereby prevent actuation of the detent means 64 by the push button 58 of the outside control means and the door control mechanism 90 is then in its locked condition. From the co-operation just described between the locking lever 93 and the control arm 81, it will be recognized that this control arm also functions as a locking arm and can be referred to as such.

The shape of the unlocking lever 97 is such that a rounded free end portion 104 thereof will co-operate with the head portion 102 of the locking lever 93 with a camming action, in response to a pulling force transmitted through the link 99, to impart clockwise swinging to the locking lever to move the latter to its unlocking position 93a. The link 99 is shown as having its adjacent end connected with the unlocking lever 97 by an attaching pin 105 of the latter. A slot 106 formed in this end of the link 99 is provided for assembly purposes so that the link can be easily connected with, or disconnected from, the attaching pin 105.

The lower portion of the locking lever 93 is relatively wide, as shown in FIG. 10, and is provided with a recess 108 and with edge portions forming locking and releasing cams 109 and 110 on opposite sides of the recess. The finger 95 is located in the recess 108 by being pivotally mounted on the flange 53 and is connected with a rotatable actuating spindle 111 which extends into the structure of the door 11 from a key-actuatable lock cylinder (not shown) mounted on the outer wall of the door 11.

Swinging of the finger 95, in a clockwise direction as seen in FIG. 10, by manual rotation of the lock cylinder of the door causes the finger to co-operate with the locking cam 109 to shift the locking lever 93 to its locking position. Swinging of the finger 95 in the opposite direction engages the same with the unlocking cam 110 to thereby shift the locking lever 93 to its unlocking position. Similarly, a downward pushing force transmitted to the lower portion of the locking lever 93 through the wire link 96 from the garnish molding button will swing the locking lever to its locking position, and an upward pulling force transmitted through the link 96 will swing the locking lever 93 to its unlocking position. A spring 113 operably disposed between, and suitably connected with, the flange 53 and the locking lever 93 functions as an over-center spring means during the swinging of the locking lever for releasably holding the latter in its locking and unlocking positions.

When the door control mechanism 90 is in the doorlatched and door-locked condition shown in FIGS. 9 and 10, the detent element 77a is in holding engagement with the ratchet tooth 73 and the control arm 81 is in a correspondingly lifted position in the slot 82. When the control arm 81 is in this lifted position, it will be received in the notch 101 of the locking lever 93 when the latter is swung to its full-line locking position of FIG. 10.

FIG. 12 shows the condition of the door control mechanism 90 when the latch 18 is in the safety-latched position at which time the teeth 47 and 48 are in a straddling relation to a tooth of the associated keeper and the detent element 77a is in holding engagement with the ratchet tooth 72. FIG. 13 shows the condition when the latch 18 is in the door-unlatched position at which time the detent element 77a is in holding engagement with the ratchet tooth 71. FIG. 14 shows the locking lever in full lines in its unlocking position which corresponds with the safety-latched and door-unlatched positions of the detent lever 75 in FIGS. 12 and 13.

For both of the safety-latched and door-unlatched conditions shown in FIGS. 12 and 13, the control arm 81 is in a relatively lowered position in the slot 82 at which time it is in a blocking position for the locking lever 93 and prevents the latter from being swung to its full-line locking position of FIG. 10. From this blocking position shown in FIGS. 12, 13 and 14 for the control arm 81, it will be apparent that any attempt to impart a counter-clockwise swinging movement to the locking lever 93 by either the key-actuatable finger 95 or the link 96, will cause the shoulder portion 103 to engage the control arm and prevent the locking lever from assuming its locking position.

FIGS. 15 to 21 inclusive of the drawings show a second modified form of door control mechanism 115 which is generally similar to the door control mechanism 10 and is intended to be used for the same type of service and to function in a generally similar manner. The door control mechanism 115 differs from the door control mechanism 10 in that it employs a keeper 16$^a$ having a different form of rack 117 and employs a latch 18$^a$ of a different form. The control mechanism 115 also differs from the control mechanism 10 in that the spring 62 is not needed and has been omitted, and in that it employs a ratchet 118 of a different form. In other respects the door control mechanism 115 is substantially the same as the door control mechanism 10 and the same reference characters have been applied to identical, or substantially identical, parts.

The latch 18$^a$ is in the form of a gear or gear wheel fixed on the pivot shaft 20 and having a full circumferential complement of teeth 119, in this instance five such teeth. The rack 117 is here shown as having two full teeth 121 and 122 and adjacent tooth spaces or recesses 123 and 124, of which the tooth recess 123 is located between the teeth 121 and 122 and is substantially centered on a vertical line 125 which passes through the pivot axis 39 of the shaft 20 when the latch 18$^a$ is in its door-latched position as shown in FIGS. 15, 16 and 19.

The phantom-line showing of the latch 18$^a$ in FIG. 16 represents the position of the latch when the closing movement of the door has brought the latch into initial contact with the keeper 16$^a$. At this time the tooth 119$^a$ is in engagement with the outer side face 121$^a$ of the tooth 121 but the tooth 119$^b$ has not yet been moved into the tooth recess 123. As the door moves to its fully-latched position, the tooth 119$^b$ assumes the fully-engaged position shown in full lines in FIG. 16 at which time this tooth is in door-supporting engagement with the rack 117 at the two points of contact 50 located on opposite sides of the tooth recess 123.

When the door is in its closed and fully-latched position just described, the upper peripheral edge portion of the guide roller 19 is in a door-holding or door-supporting engagement with the pawl 42 of the keeper 16$^a$ and the lower peripheral edge of the roller is spaced above the lower edge wall portion 28 of the keeper. The roller 19 is then also in a position in the keeper 16$^a$ to be engageable with the front wall 27 of the latter as an anti-spread element. The co-operation of the roller 19 with a portion of the guide surface 40 during movement of the latch 18$^a$ into the keeper is represented by the phantom-line showing of the roller in FIG. 16.

As mentioned above and as shown in FIG. 19 of the drawings, the ratchet 118 is in the form of a ratchet wheel having a full circumferential complement of ratchet teeth 127 separated by intervening recesses or tooth spaces 128. The ratchet 118 has twice as many teeth as the latch 18$^a$, namely ten teeth, and the ratchet is secured on the shaft 20 in an angular relation such that the holding co-operation of the detent element 77$^a$ of the detent means 64 will properly locate the teeth of the latch 18$^a$ with respect to the rack 117 for producing the door-latched condition described above for the door 11.

It should be explained with respect to the door control mechanism 115, that the provision of the latch 18$^a$ having a full tooth complement and the use of the ratchet 118 in association therewith result in the advantage that the latch can never be in an incorrect or out-of-time position which would prevent it from meshing properly with the rack 117 when the door 11 moves to its closed position. Because of the full circumferential complement of teeth provided on the latch 18$^a$ and on the ratchet 118, with the teeth of the ratchet being twice as numerous as those of the latch, the latch and ratchet will always be self-adjusting with respect to a proper angular setting or positioning thereof for their intended co-operation respectively with the rack 117 and the detent arm 77.

In the door control mechanism 115 as represented in FIG. 19, the teeth 119 of the latch 18$^a$ are spaced 72° apart and the teeth 127 of the ratchet 118 are spaced 36° apart. The amount of rotation of the latch 18$^a$ in moving from its phantom-view position of FIG. 16 to its door-latched position of FIG. 19 is 72° and the corresponding angular movement of the ratchet 118 causes the latter to advance two tooth spaces relative to the detent element 77$^a$ of the detent means 64.

It will therefore be seen that a 36° rotative movement of the latch 18$^a$ and ratchet 118 will result in engagement of the detent element 77$^a$ in the first of such two tooth spaces of the ratchet and a partial engagement of the latch tooth 119$^b$ in the tooth space 123 of the rack 117 as is clearly shown in FIG. 20. This condition of the control mechanism 115 will be its safety-latched condition by which the door will be held in a safety-latched position by the partial engagement of the tooth 119$^b$ in the tooth recess 123. Release of the tooth 119$^b$ from the tooth recess 123 at this time by riding up and over the tooth 121 will be prevented by the upper portion of the roller 19 coming into engagement with the upper edge wall portion 129 of the keeper 16$^a$.

It should be explained also with respect to the door control mechanism 115 that when the link 67 of the inside control means is in its blocking position with respect to the control arm 81 of the detent means 64, as shown in FIGS. 15 and 19, the link will extend into the path of downward swinging movement of this control arm to thereby prevent swinging of the detent lever 75 in a counterclockwise direction to disengage the detent element 77$^a$ from the ratchet 118 and the mechanism will then be in its door-latch and door-locked condition.

FIGS. 20 and 21 further illustrate the safety-latched condition of the door control mechanism 115, at which time the teeth 119$^a$ and 119$^b$ of the latch 18$^a$ straddle the tooth 121 of the keeper 16$^a$ as shown in FIG. 20, and the detent element 77$^a$ is holdingly engaged in one of the tooth recesses 128 of the ratchet 118 as shown in FIG. 21. In FIG. 20, the close proximity of the upper portion of the roller 19 to the guide wall portion 129 of the keeper 16$^a$ at this time, is shown and from which it will be recognized that co-operative engagement of the roller with this guide wall portion will prevent either of the ratchet teeth 119$^a$ and 119$^b$ from riding over the keeper tooth 121.

FIGS. 22 to 28 inclusive of the drawings show a third modified form of door control mechanism 130 which, in certain respects, resembles the door control mechanism 90 and in other respects resembles the door control mechanism 115. The modified door control mechanism 130 resembles the door control mechanism 90 in that it includes a locking lever 93$^b$, very similar to the locking lever 93, in the same location and for the same purpose and actuatable to locking and unlocking positions by either a key-operable finger 95 or a push-pull link 96. The lever 93$^b$ is also actuatable in an unlocking direction by an unlocking lever 97 of the inside control means, or by a kick-out action resulting from actuation of a portion of a detent means 131 by the ratchet 118$^a$ as explained hereinafter.

Although the locking lever 93$^b$ has been referred to as very similar to the above-described locking lever 93 of the door control mechanism 90, it differs therefrom in that it is provided with a notch 132 in the edge of the upper portion of this lever and a shoulder 133 facing toward the notch at the lower end of the latter. The notch 132 accommodates a kick-out finger portion 134 of the detent means 131 and the shoulder 133 is engageable by such finger portion under certain conditions as will be explained hereinafter.

The door control mechanism 130 includes the same latch 18ᵃ as is used in the door control mechanism 115 and also includes a ratchet 118ᵃ which is of a form similar to the above-described ratchet 118. The door control mechanism 130 includes a keeper of the same form as the keeper 16ᵃ employed in the door control mechanism 115 and which carries the same rack 117.

The ratchet 118ᵃ is similar to the above-described ratchet 118 in that it has the same number of teeth 127 but differs from the ratchet 118 in that the tooth spaces or recesses between the pairs of adjacent teeth comprise full-depth and shallow-depth recesses 135 and 136 in an alternating or staggered relation around the circumference of the ratchet. The detent element 77ᵃ of the detent arm 77 is engageable in either a full-depth recess 135 (see FIG. 23) or a shallow-depth recess 136 (see FIG. 26) depending upon the rotative position of the ratchet 118ᵃ and of the latch 18ᵃ but, when the detent element is engaged in a full-depth recess 135 the latch will always be held in a door-latched position, that is to say in a position with the latch tooth 119ᵇ centered on the vertical line 125 passing through the rotation axis 39 of the pivot shaft 20. When the detent element 77ᵃ is engaged in a shallow-depth recess 136, the latch 18ᵃ will always be held in a position corresponding with the above-described safety-latched condition of the door.

The door control mechanism 130 differs also from all of the door control mechanisms described above including the control mechanism 115, in that the detent means 131 thereof is of a somewhat different form than the detent means 64. The detent means 131 comprises two levers 138 and 139 swingably mounted on a common pivot pin 140 of the flange 54. The lever 138 is a detent operating lever having an outside actuating arm 141, carrying a contact portion 142 engageable by a push-button stem 143 of the outside control means of the vehicle door, and an inside control arm 145 corresponding with the control arm 81 of the detent means 64 and which extends in the same relative position with respect to the locking lever 93ᵇ and the notch 101 of the latter. The inside control arm 145 thus functions also as a locking arm.

The lever 139 of the detent means 131 is a combined detent and control lever having a detent arm 77 carrying a hook-shaped portion forming a detent element 77ᵃ, and a co-operating control arm 146 extending into co-operating relation to the control arm 145 and the locking lever 93ᵇ. As shown in FIGS. 22, 23 and 27, the co-operating control arm 146 of the lever 139 extends beneath an offset portion of the control arm 145 so as to be engageable by the lower edge of the latter in response to a counterclockwise or downward manual swinging of the lever 138 by the push button stem 143. This actuating engagement of the control arm 145 with the co-operating control arm 146 causes a corresponding counterclockwise swinging of the lever 139 for disengaging the detent element 77ᵃ from the ratchet 118ᵃ. The co-operating control arm 146 also has at the free end thereof the above-mentioned finger 134 which extends into, and is operable in, a clearance slot 147 of the flange 53 and has a rounded end engageable with the shoulder 133 of the locking lever 93ᵇ (see FIG. 28) to produce the kick-out unlocking movement of the latter.

A spiral spring 149 is mounted on the pivot pin 140 and is effective for biasing the co-operating control arm 146 in an upward direction to normally maintain the same with the upper edge thereof in engagement with the control arm 145 of the lever 138. This action of the spring 149 on the co-operating control arm 146, tending to cause clockwise swinging of the lever 139, also biases the detent element 77ᵃ of the detent arm 77 toward engagement with the ratchet 118ᵃ.

The detent means 131 also includes a tension spring 150 having hook ends 150ᵃ and 150ᵇ connected respectively with the levers 138 and 139. The hook end 150ᵃ is here shown as being engaged with the offset portion of the control arm 145 and the hook end 150ᵇ is shown engaged in a hole of the cooperating control arm 146. The tension spring 150 permits a temporary separation of the arm 146 from the arm 145 (see FIG. 27), when the detent lever 77 is swung in a counterclockwise direction by the ratchet 118ᵃ for producing the above-mentioned kick-out unlocking movement of the locking lever 93ᵇ, and provides an actuating force for moving the control arm 145 to its lowered position of FIGS. 26, 27 and 28 in which this control arm is in a blocking relation to the locking lever.

As long as the detent element 77ᵃ is engaged in a shallow-depth recess 136 the lever 139 will be in the position shown in FIG. 26 and the control arm 145 will be maintained in its lowered blocking position by the tension spring 150. When the control arm 145 is in this blocking position it will prevent movement of the locking lever 93ᵇ to its locking position because any attempt to so move the locking lever, by means of the link 96 or the key-actuatable finger 95, will cause the shoulder portion 103 to engage this control arm as is apparent in FIG. 28. cause the shoulder portion 103 to engage this control arm It will now be understood that whenever the locking lever 93ᵇ is in its unlocking position shown in FIG. 28, to which position it may have been moved by either the link 96 or the unlocking lever 97, or by the key-operated finger 95, the inside control arm 145 of the detent means 131 will be released from the notch 101 so that the actuating lever 138 can be manually swung by means of the push button stem 143 to cause the detent element 77ᵃ to release the ratchet 118ᵃ. The vehicle door will then be in a closed but unlatched condition and can be swung open. When the door is reclosed, the detent element 77ᵃ will be engaged in one or the other of the tooth recesses 135 or 136 of the ratchet 118ᵃ, depending upon whether the door has been fully closed to its door-latched position or only partially closed to its safety-latched position.

As the door approaches its closed position and the latch 18ᵃ engages the keeper 16ᵃ, the ratchet 118ᵃ will be driven by the latch in a counterclockwise direction as indicated by the arrow 151 of FIG. 27 and the teeth of the ratchet moving past the detent element 77ᵃ will impart a force counterclockwise swinging to the lever 139 to produce a downward actuating movement of the co-operating control arm 146. The position in which the lever 139 is shown in FIG. 27 is with the detent element 77ᵃ resting on the crest of one of the ratchet teeth which represents the maximum extent of the forced downward actuating movement of the cooperating control arm 146 by the action of the ratchet 118ᵃ. The lever 139 can however be swung farther in a counterclockwise direction, by the lever 138 in response to actuation of the latter by the push button stem 143, and until the inside periphery of the arm 146 contacts the teeth of the ratchet 118ᵃ.

If the door 11 has been closed only to its safety-latched position, the detent element 77ᵃ will become engaged in one of the shallow-depth recesses 136 of the ratchet 118ᵃ immediately following the counterclockwise swinging of the lever 139 by the ratchet. Under the circumstances, the pulling action of the tension spring 150 causes the control arm 145 to be moved downwardly to its lowered blocking position. Therefore, as long as the door control mechanism 130 is in a safety-latched condition, the control arm 145 will be held in its lowered position where it will function as a preventer means engageable by the edge portion 103ᵃ, as explained above, to prevent movement of the locking lever 93ᵇ to its locking position. Under these conditions of the door control mechanism 130, neither the key-actuated finger 95 nor the link 96 will be operable to swing the locking lever 93ᵇ to its locking position and the operator will be made aware of the fact that the door has not been fully closed because of his inability to actuate the mechanism to its locked condition.

If, however, the door 11 has been moved to its fully-closed position the detent element 77ª will become engaged in one of the full-depth recesses 135 of the ratchet 118ª, as shown in FIG. 23, and the rotative position of the lever 138 will then be such that the control arm 145 will be in its lifted position and will be receivable in the notch 101 of the locking lever 93ᵇ. Under these conditions the locking lever will be freely swingable to its locking position shown in FIG. 24, either by the key operable finger 95 or by the link 96, to establish a locked condition of the mechanism.

In the event that the door control mechanism 130 is actuated to a locked condition either by the key operable finger 95 or the link 96 while the door 11 is in an open position, it is desirable that the mechanism be automatically unlocked in response to closing of the door so as to prevent damage to any of the parts and to also prevent the operator from unintentionally locking himself out of the vehicle. This automatic unlocking is accomplished by the unlocking or kick-out finger 134 of the lever 139 when the latter is forcibly swung in a counterclockwise direction by the rotative movement of the ratchet 118ª resulting from the cooperation of the latch 18ª with the keeper when the door is moved to its closed position. Under the conditions just mentioned, the finger 134 engages the shoulder 133 and swings the locking lever 93ᵇ to its unlocking position shown in FIG. 28.

If the door control mechanism 130 is in a locked condition while the door is in an open position, as has been assumed in the description just above, the control arm 145 will lie in the notch 101 of the locking lever 93ᵇ and the shoulder portion 103 of the latter will then prevent downward movement of this control arm while the cooperating control arm 146 is being swung in its downward actuating direction by the action of the ratchet 118ª on the detent element 77ª. Therefore during the downward movement of the cooperating control arm 146, which causes the automatic kick-out movement of the locking lever 93ᵇ to its unlocking position and takes place while the shoulder portion 103 is preventing a corresponding downward movement of the control arm 145, the above-mentioned temporary separation of the arm 146 relative to the arm 145 takes place.

In FIG. 27 the phantom-line showing of the lever 138 represents the lifted or locking position of the control arm 145, and the angular displacement between this phantom-line showing and the full-line position shown for the cooperating control arm 146 indicates the temporary gap or separation of the arm 146 relative to the arm 145 as referred to above. The arm 146 is shown in full lines in this FIG. 27 which represents the position it assumes when it is moved by the forced counterclockwise rotation of the ratchet 118ª by the latch 18ª during the movement of the door to its closed position. This temporary separation further tensions the spring 150 and, as soon as the shoulder portion 103 has been swung clear of the lower edge of the control arm 145 by the kick-out action of the finger 134 of the arm 146 in moving the locking lever 93ᵇ to its unlocking position, the pulling action of the tension spring immediately moves the control arm 145 downward to its full-line position in engagement with the co-operating control arm 146.

If the closing movement of the door causes the detent element 77ª to come to rest in a full depth recess 135 of the ratchet 118ª, the control arm 145 will be left in its lifted position in which it lies opposite the notch 101 of the locking lever. Since this condition of the control mechanism 130 represents a fully closed and latched condition of the door 11, the locking lever 93ᵇ will then be readily movable to its locking position. If, however, the door closing movement causes the detent portion 77ª to drop into a shallow-depth recess 136 of the ratchet 118ª its partially lowered position in which it is in the above-described blocking relation to the locking lever 93ᵇ and engageable by the edge portion 103ª of the latter, and when in such condition, as can readily be understood from the above description, the control arm 145 cannot be locked by the locking lever 93ᵇ.

From the foregoing description and the accompanying drawings it will now be readily understood that this invention provides door control mechanisms of a simple and practical construction and which will operate in an efficient and satisfactory manner for controlling vehicle doors, or for other door control purposes, and that the mechanisms consist of a relatively small number of parts adapted to be economically produced and assembled into units which can be readily installed. It will now also be understood that the door control mechanisms provided by this invention operate efficiently to control a door, not only with respect to a latched or unlatched condition thereof and with respect to a locked or unlocked condition thereof, but also effectively support the door and hold the same against chatter or rattle when the door is in its closed position, as well as to prevent spreading between the door and associated doorpost in the event of a collision.

Although the door control mechanisms of this invention have been illustrated and described herein to a somewhat detailed extent it will be understood, of course, that the invention is not to be regarded as being limited correspondingly in scope but includes all changes and modifications coming within the terms of the claims hereof.

Having described my invention, I claim:

1. In door control mechanism for use with a doorpost and a swingable door having an edge face in an opposed relation to said doorpost when the door is in closed position; a hollow keeper secured on said doorpost comprising connected front and edge walls and having a latch receiving opening which includes a notch in said front wall and a keeper pocket at the rear of said front wall; said edge wall having an access opening communicating in a lateral direction with said pocket and notch; said pocket having upper and lower pocket portions extending above and below said notch, and an intermediate pocket portion on the side of said notch remote from said access opening; said front wall having continuously connected portions comprising vertically spaced upper and lower front wall portions above and below said notch and overlying said upper and lower pocket portions, and an intermediate front wall portion overlying said intermediate pocket portion; holding means on said lower front wall portion; a latch pivoted on said door adjacent said edge face and movable into said latch receiving opening to a door-latched position in engagement with said holding means; said edge wall having a lower edge wall portion spaced below said holding means and forming the bottom of said lower pocket portion; and a roller pivoted on said door adjacent said edge face for guiding engagement with said lower edge wall portion during movement of the roller into said access opening to facilitate entry of the latch into said latch receiving opening; said latch and roller having a common pivot axis; said roller being movable into said pocket to a door-latched position behind, and in overlapping relation to, said upper, lower and intermediate front wall portions to prevent spreading apart of said door and doorpost; the door-latched position of said roller being with the lower portion thereof in spaced relation to said lower edge wall portion, and the door-latched position of said latch being in a door-supporting engagement with said holding means.

2. In door control mechanism for use with a doorpost and a swingable door having an edge face in an opposed relation to said doorpost when the door is in closed position; a hollow keeper secured on said doorpost comprising connected front and edge walls and having a latch receiving opening which includes a notch in said front wall and a keeper pocket at the rear of said front wall;

holding means on said front wall at one side of said notch as shown in FIG. 26, the control arm 145 will be left in with reference to the vertical direction; said edge wall having an access opening communicating in a lateral direction with said notch and pocket and including an edge wall portion spaced from said holding means in a vertical direction; a latch pivoted on said door adjacent said edge face and movable into said latch receiving opening to a door-latched position in engagement with said holding means; a roller pivoted on said door adjacent said edge face for guiding engagement with said edge wall portion during movement of said roller into said access opening to facilitate entry of the latch into said latch receiving opening; said latch and roller having a common pivot axis; said roller being movable into said pocket to a door-latched position behind, and in overlapping relation to, said front wall to prevent spreading apart of said door and doorpost; and thrust means mounted on said keeper and located in said pocket on the vertically opposite side of said notch from said edge wall portion; the door-latched position of said roller being with one peripheral portion thereof in engagement with said thrust means for preventing shifting of the door in one vertical direction and a substantially opposite peripheral portion in spaced relation to said edge wall portion, and the door-latched position of said latch being in a door-positioning engagement with said holding means for preventing shifting of the door in the opposite vertical direction.

3. In door control mechanism for use with a doorpost and a swingable door having an edge face in an opposed relation to said doorpost when the door is in closed position; a hollow keeper secured on said doorpost comprising connected front and edge walls and having a latch receiving opening which includes a laterally extending notch in said front wall and a keeper pocket at the rear of said front wall; a rack on said front wall at the lower side of said notch; a toothed latch pivoted on said door adjacent said edge face and movable into said latch receiving opening to a door-latched position in engagement with said rack; said edge wall having an access opening communicating in a lateral direction with said notch and pocket and including a lower edge wall portion below and spaced from said rack; and a roller pivoted on said door adjacent said edge face for guiding engagement of the lower segment thereof with said edge wall portion during movement of said roller into said access opening to facilitate entry of the latch into said latch receiving opening; said latch and roller having a common pivot axis; said roller being movable into said pocket to a door-latched position behind, and in overlapping relation to, portions of said front wall lying on vertically opposite sides of said notch to prevent spreading apart of said door and doorpost; the door-latched position of said roller being with said lower segment in spaced relation to said lower edge wall portion and the door-latched position of said latch being in a door-supporting engagement with said rack.

4. In door control mechanism for use with a doorpost and a swingable door having an edge face in an opposed relation to said doorpost when the door is in closed position; a hollow keeper secured on said doorpost comprising connected front and edge walls and having a latch receiving opening which includes a laterally extending notch in said front wall and a keeper pocket at the rear of said front wall; said pocket having upper and lower pocket portions on vertically opposite sides of said notch, and said front wall having upper and lower front wall portions overlying said upper and lower pocket portions; said edge wall having an access opening communicating in a lateral direction with said pocket and notch, and a lower edge wall portion at the bottom of said lower pocket portion; a rack on said lower front wall portion; a toothed latch pivoted on said door adjacent said edge face and movable into said opening to a door-latched position in engagement with said rack; a roller pivoted on said door adjacent said edge face for guiding engagement of the lower segment of the roller with said lower edge wall portion during movement of said roller into said access opening to facilitate entry of the latch into said latch receiving opening; said latch and roller having a common pivot axis; said roller being of greater diameter than the vertical width of said notch and being movable into said pocket to a door-latched position behind said front wall with upper and lower segments of the roller overlapping and engageable with said upper and lower front wall portions to prevent spreading apart of said door and doorpost; the door-latched position of said roller being with said lower segment in spaced relation to said lower edge wall portion and the door-latched position of said latch being in a door-supporting engagement with said rack; and thrust means in said keeper and engageable by the periphery of the upper segment of said roller for retaining said latch in an antirattle engagement with said rack.

5. Door control mechanism as defined in claim 4 wherein the last-mentioned means comprises a thrust member and means supporting the same for movement in said upper pocket portion, and spring means for yieldingly pressing said thrust member against said roller.

6. In door control mechanism for use with a doorpost and a swingable door having an edge face in an opposed relation to said doorpost when the door is in closed position; a hollow keeper secured on said doorpost comprising connected front and edge walls and having a latch receiving opening which includes a notch in said front wall and a keeper pocket at the rear of said front wall; a rack on said front wall at the lower side of said notch; a toothed latch on said door adjacent said edge face and movable into said latch receiving opening to a door-latched position in engagement with said rack; said edge wall having an access opening communicating in a lateral direction with said pocket and notch and including a lower edge wall portion below and spaced from said rack; a roller adjacent said edge face for guiding engagement with said lower edge wall portion at a location adjacent said access opening during movement of said roller into the latter to facilitate entry of the latch into said latch receiving opening; and means for connecting said latch and roller with said door and providing the latch and roller with a common pivot axis; said roller being of greater diameter than the vertical transverse dimension of said notch and being movable into said pocket to a door-latched position behind, and in overlapping relation to and engageable with, portions of said front wall lying on vertically opposite sides of said notch to prevent spreading apart of said door and doorpost; said lower edge wall portion including a concavely curved segment spaced laterally from said access opening and having its concavity facing toward said rack; the door-latched position of said roller being with the lower segment thereof in spaced relation to the curved segment of said lower edge wall portion, and the door-latched position of said latch being in a door-supporting meshed engagement with said rack.

7. In door control mechanism for use with a doorpost and a swingable door having an edge face in an opposed relation to said post when the door is in closed position; a hollow keeper secured on said doorpost comprising connected front and edge walls and having a latch receiving opening which includes a notch in said front wall and a keeper pocket at the rear of said front wall; a rack on said front wall at the lower side of said notch; a latch pivoted on said door adjacent said edge face and movable into said latch receiving opening to a door-latched position in mesh with said rack; a ratchet connected with said latch; detent means releasably cooperating with said ratchet for holding said latch in door-latched engagement with said rack and including manually operable means for actuating said detent means to release said ratchet; locking means movable to a locking position for engagement by said detent means to prevent ratchet-releasing actuation of the latter; said pocket having upper and lower pocket portions on vertically opposite sides of said notch, and said front wall having upper and lower front wall portions overlying said upper and lower pocket portions; said edge wall having an access opening communicating in a lateral direction with said pocket and notch, and a lower edge wall portion at the bottom of said lower pocket portion; and a roller pivoted on said door adjacent said edge face for guiding engagement of the lower segment of the roller with said edge wall portion during movement of said roller into said access opening to facilitate entry of the latch into said latch receiving opening; said latch and roller having a common pivot axis; said roller being movable into said pocket to a position behind, and in overlapping relation to, said upper and lower front wall portions to prevent spreading apart of said door and doorpost; the door-latched position of said roller being with said lower segment thereof in spaced relation to said lower edge wall portion, and the door-latched position of said latch being in a door-supporting engagement with said rack.

8. In door control mechanism for use with a doorpost and a swingable door having an edge face in an opposed relation to said post when the door is in closed position; a hollow keeper secured on said post comprising connected front and edge walls and having a latch receiving opening which includes a notch in said front wall and a keeper pocket at the rear of said front wall; a rack on said front wall at the lower side of said notch; a toothed latch pivoted on said door adjacent said edge face and movable into said latch receiving opening to a door-latched position in mesh with said rack; a ratchet connected with said latch; detent means releasably cooperating with said ratchet for holding said latch in door-latched engagement with said rack and including manually operable means for actuating said detent means to release said ratchet; locking means movable to a locking position for engagement by said detent means to prevent ratchet-releasing actuation of the latter; said pocket having upper and lower pocket portions on vertically opposite sides of said notch, and said front wall having upper and lower front wall portions overlying said upper and lower pocket portions; said edge wall having an access opening communicating in a lateral direction with said pocket and notch, and a lower edge wall portion at the bottom of said lower pocket portion; a roller pivoted on said door adjacent said edge face for guiding engagement of the lower segment of the roller with said edge wall portion during movement of said roller into said access opening to facilitate entry of the latch into said latch receiving opening; said roller being of greater diameter than the vertical transverse dimension of said notch and being movable into said pocket to a position behind, and in overlapping relation to, said upper and lower front wall portions to prevent spreading apart of said door and doorpost; the door-latched position of said roller being with said lower segment thereof in spaced relation to said lower edge wall portion, and the door-latched position of said latch being in a door-supporting engagement with said rack; and thrust means in said upper pocket portion and engageable by the upper segment of the periphery of said roller for retaining said latch in a downwardly pressed antirattle engagement with said rack.

9. In door control mechanism, a keeper comprising connected front and lower edge walls and adapted for mounting on a doorpost for forming with the latter a keeper pocket, said front wall having a laterally extending latch-receiving opening therein and upper and lower front wall portions above and below said latch-receiving opening, a rack on said front wall portion and having teeth extending above said lower edge wall portion, a support member adapted for mounting on an associated door swingable relative to said doorpost, a pivot shaft carried by said support member, a toothed latch on said shaft and movable into said latch-receiving opening to a door-latched position in door-supporting meshed engagement with said rack, a ratchet connected with said latch, detent lever means pivotally mounted on said support member and comprising a swingable detent arm releasably engageable with said ratchet for retaining said latch in its door-latched position and a swingable control arm, a first manually actuatable means effective on said detent lever means to cause a ratchet-releasing movement of said detent arm, a second manually actuatable means including a locking member movable to and from a blocking position relative to said control arm for preventing the ratchet-releasing movement of said detent arm, and a roller on said shaft for guiding engagement of the lower segment of the roller with said lower edge wall portion to facilitate movement of said latch to said meshed engagement and said lower segment being spaced above said lower edge wall portion when said latch reaches its door-latched position, said roller being of larger diameter than the vertical transverse dimension of said latch-receiving opening and being movable to a position in said pocket with upper and lower segments of the roller lying behind and engageable with said upper and lower front wall portions to prevent spreading apart of said door and doorpost.

10. Door control mechanism as defined in claim 9 wherein said first manually actuatable means comprises an outside control means and said second manually actuatable means comprises a key-actuated means, and wherein said locking member comprises a lever pivotally mounted on said support member and swingable to and from said blocking position by said key-actuated means.

11. Door control mechanism as defined in claim 9 wherein said first manually actuatable means is an outside control means and said second manually actuatable means is an inside control means comprising a lever pivoted on said support member for swingable actuating engagement with said detent means and a link having a pin and slot connection with said lever, said locking member being a part of said link.

12. In door control mechanism; a keeper adapted for mounting on a doorpost and comprising connected front wall and edge wall portions; said front wall portion having a latch receiving opening and a rack at one side of said opening; a support adapted for mounting on an associated door swingable relative to said doorpost; a pivot shaft mounted in said support; a latch on said shaft comprising a gear having a full circumferential complement of teeth and being movable into said opening to door-latched and door safety-latched positions in meshed engagement with said rack; a roller on said shaft for guiding engagement with said edge wall portion to facilitate movement of said latch into said opening; said roller being movable to a position behind, and in overlapping relation to, said front wall portion to prevent spreading apart of said door and doorpost; a ratchet connected with said latch; detent means releasably engageable with said ratchet for controlling pivotal movement of said latch; and manually operable means for actuating said detent means to release said ratchet; said ratchet having a full circumferential complement of teeth separated by intervening full-depth and shallow-depth tooth recesses in alternating relation; said detent means being effective when engaged in a full-depth recess to retain said latch in said door-latched position and being effective when engaged in a shallow-depth recess to retain said latch in said safety-latched position.

13. Door control mechanism as defined in claim 12 wherein the full-depth tooth recesses of said ratchet are the same in number as the teeth of said latch.

14. In door control mechanism; a keeper adapted for mounting on a doorpost and comprising connected front wall and edge wall portions; said front wall portion having a latch receiving opening and a rack at one side of said opening; a support adapted for mounting on an associated door swingable relative to said doorpost; a pivot shaft mounted in said support; a latch on said shaft comprising a gear having a full circumferential complement of teeth and being movable into said opening to door-latched and door safety-latched positions in meshed engagement with said rack; a roller on said shaft for guiding engagement with said edge wall portion to facilitate movement of said latch into said opening; said roller being of larger diameter than the transverse dimension of said opening and being movable to a position behind said front wall portion to prevent spreading apart of said door and doorpost; a ratchet connected with said latch; detent means releasably engageable with said ratchet for controlling pivotal movement of said latch; manually operable means for actuating said detent means to release said ratchet; said ratchet having a full circumferential complement of teeth separated by intervening full-depth and shallow-depth tooth recesses in alternating relation; said detent means being effective when engaged in a full-depth recess to retain said latch in said door-latched position and being effective when engaged in a shallow-depth recess to retain said latch in said safety-latched position; a locking member pivoted on said support for swinging to a locking position and including a blocking portion for blocking the ratchet-releasing actuation of said detent means when the locking member is in said locking position; and preventer means associated with said detent means and effective to prevent movement of said locking member to its locking position when said detent means is engaged in one of the shallow-depth recesses of said ratchet.

15. In door control mechanism; a keeper adapted for mounting on a doorpost and comprising connected front and edge walls; said front wall having a latch receiving opening extending laterally thereinto and a rack thereon at one side of said latch receiving opening with reference to the vertical direction; a support adapted for mounting on an associated door swingable relative to said doorpost; the mounted position of said keeper being with said front wall spaced from a portion of said doorpost to provide therebetween a pocket comprising upper and lower pocket portions on vertically opposite sides of said latch receiving opening and an intermediate pocket portion in a laterally adjacent relation to said latch receiving opening; said front wall having continuously connected upper, lower and intermediate front wall portions overlying said upper, lower and intermediate pocket portions; said edge wall having an access opening communicating laterally with said latch receiving opening and pocket and including a lower edge wall portion located below said latch receiving opening; a pivot shaft mounted in said support; a latch on said shaft comprising a gear having a full circumferential complement of teeth and being movable into said latch receiving opening to door-latched and door safety-latched positions in meshed engagement with said rack; a roller on said shaft for guiding engagement with said lower edge wall portion during movement of said roller into said access opening to facilitate movement of said latch into said latch receiving opening; said roller being of larger diameter than the transverse dimension of said latch receiving opening and being movable to a position in said pocket with segments of the roller located behind said upper, lower and intermediate front wall portions to prevent spreading apart of said door and doorpost; a ratchet connected with said latch; detent lever means pivotally mounted on said support and comprising a swingable detent arm releasably engageable with said ratchet for retaining said latch in its door-latched and door safety-latched positions and a swingable control arm; a first manually actuatable means effective on said detent lever means to cause a ratchet-releasing movement of said detent arm; and a second manually actuatable means including a locking member movable to and from a blocking position relative to said control arm for preventing the ratchet-releasing movement of said detent arm.

16. Door control mechanism as defined in claim 15 wherein said first manually actuatable means comprises an outside control means and said second manually actuatable means comprises a key-actuated means; and wherein said locking member comprises a lever pivotally mounted on said support and swingable to and from said blocking position by said key-actuated means.

17. Door control mechanism as defined in claim 15 wherein said first manually actuatable means is an outside control means, and said second manually actuatable means is an inside control means comprising a lever pivoted on said support for swingable actuating engagement with said detent means and a link having a pin and slot connection with said lever; said locking member being a part of said link.

References Cited in the file of this patent

UNITED STATES PATENTS

| | | |
|---|---|---|
| 2,665,159 | Allen | Jan. 5, 1954 |
| 2,683,050 | Allen | July 6, 1954 |
| 2,814,193 | Roethel | Nov. 26, 1957 |
| 2,893,774 | Carpenter | July 7, 1959 |
| 2,911,248 | Baker | Nov. 3, 1959 |
| 2,914,352 | Roethel | Nov. 24, 1959 |
| 2,914,353 | Roethel | Nov. 24, 1959 |
| 2,916,318 | Van Voorhees | Dec. 8, 1959 |